May 7, 1935.  C. R. ALDEN  2,000,553

MACHINE TOOL

Filed March 17, 1932   13 Sheets-Sheet 3

Inventor
Carroll R. Alden
By Chindahl, Parker & Carlson
Attorneys

May 7, 1935.  C. R. ALDEN  2,000,553
MACHINE TOOL
Filed March 17, 1932   13 Sheets-Sheet 4

Inventor
Carroll R. Alden
By Chindahl, Parker & Carlson
Attorneys

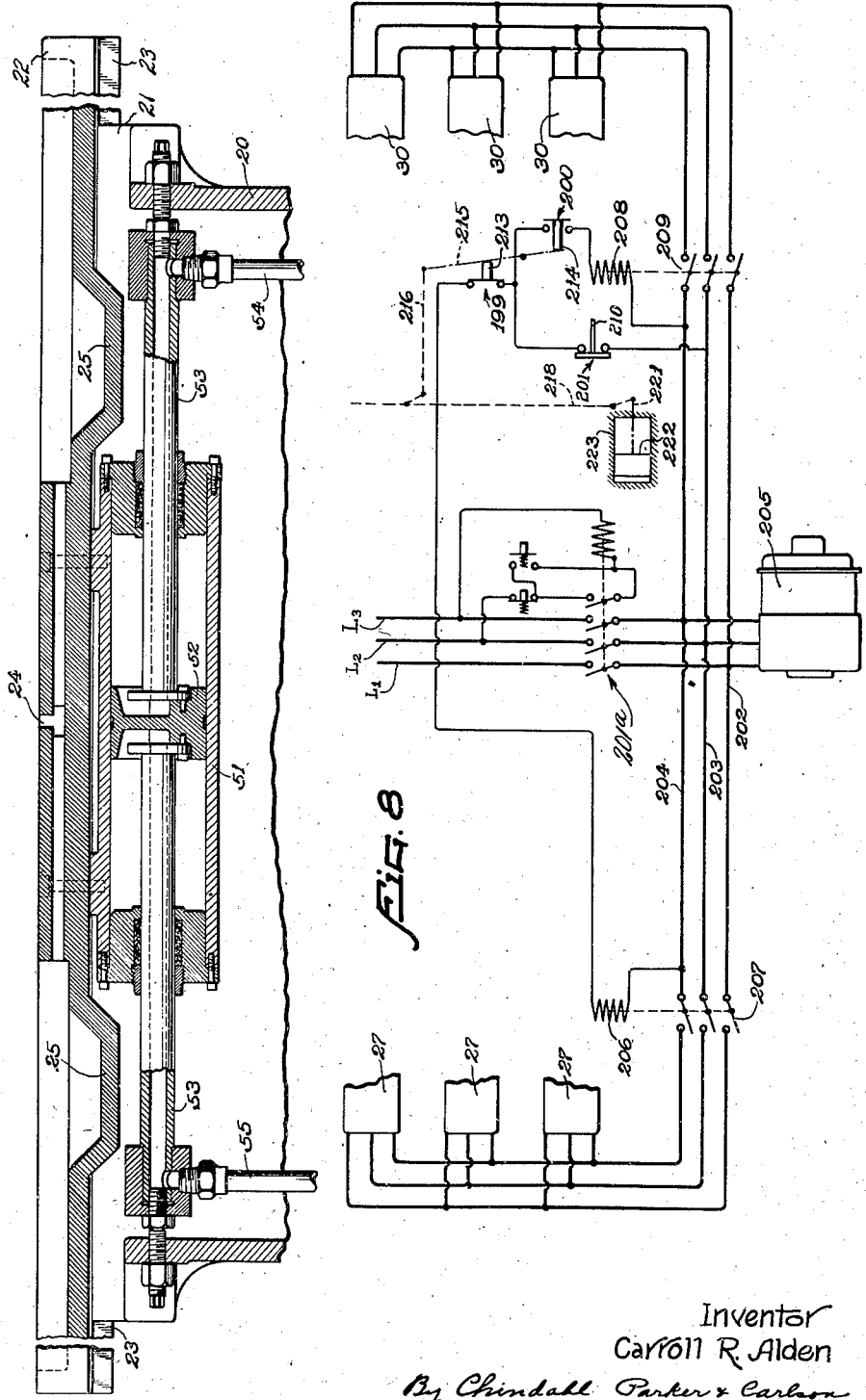

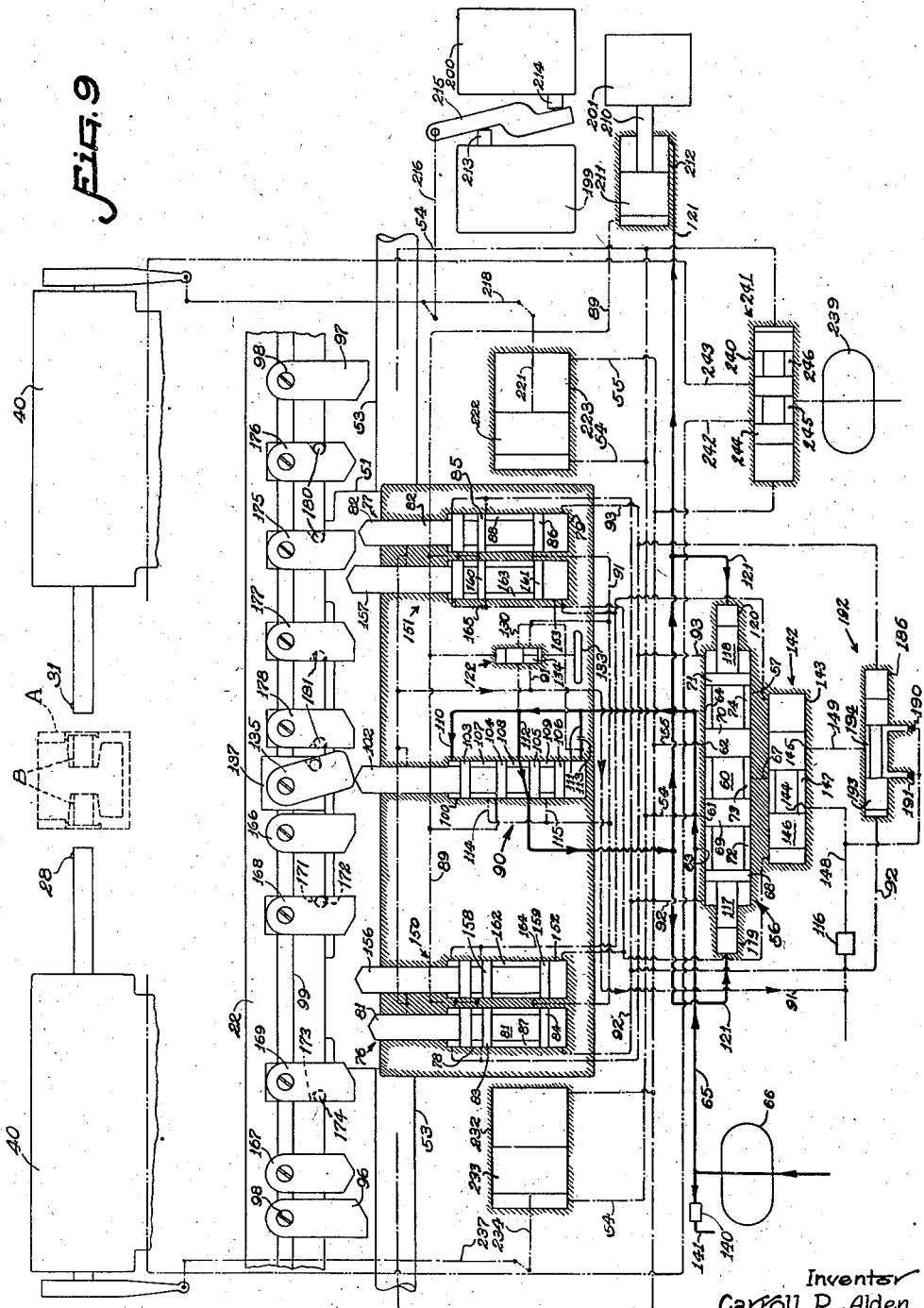

May 7, 1935.  C. R. ALDEN  2,000,553
MACHINE TOOL
Filed March 17, 1932   13 Sheets-Sheet 7
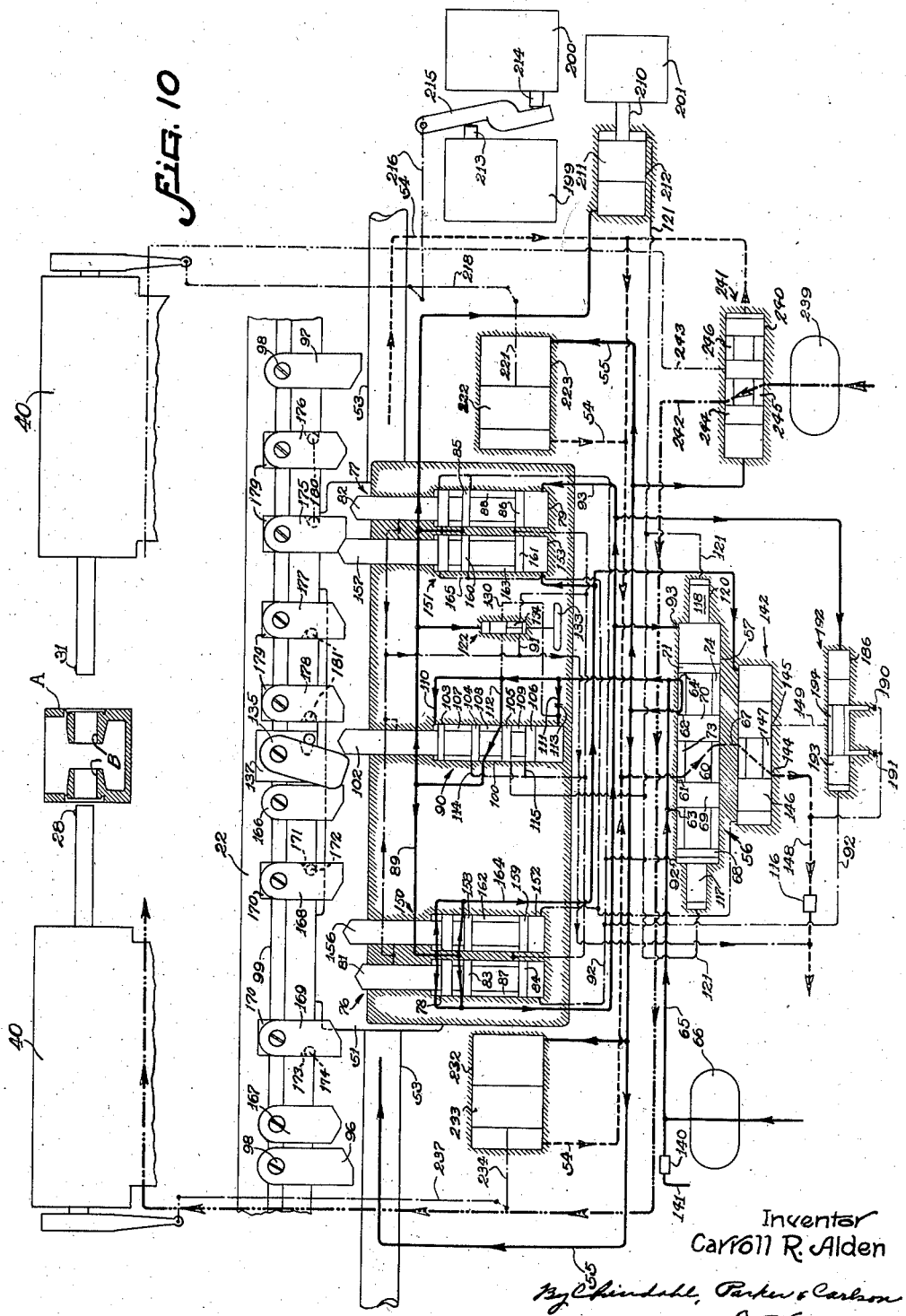
Inventor
Carroll R. Alden
By Chindahl, Parker & Carlson
Attorneys May 7, 1935.

C. R. ALDEN 2,000,553

MACHINE TOOL

Filed March 17, 1932     13 Sheets-Sheet 8

Inventor
Carroll R. Alden
By Chindahl, Parker & Carlson
Attorneys

May 7, 1935.  C. R. ALDEN  2,000,553
MACHINE TOOL
Filed March 17, 1932   13 Sheets-Sheet 10

Inventor
Carroll R. Alden
By Chindell, Parker & Carbson
Attorneys

Inventor
Carroll R. Alden
By Chindahl, Parker & Carlson
Attorneys

May 7, 1935.    C. R. ALDEN    2,000,553
MACHINE TOOL
Filed March 17, 1932    13 Sheets-Sheet 13
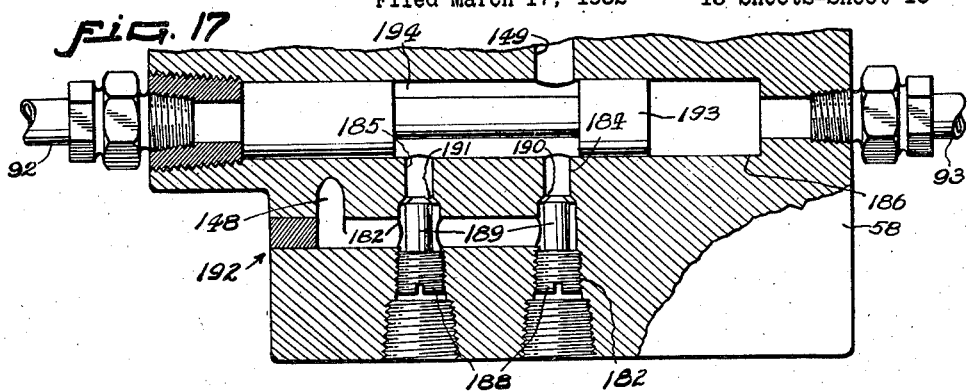
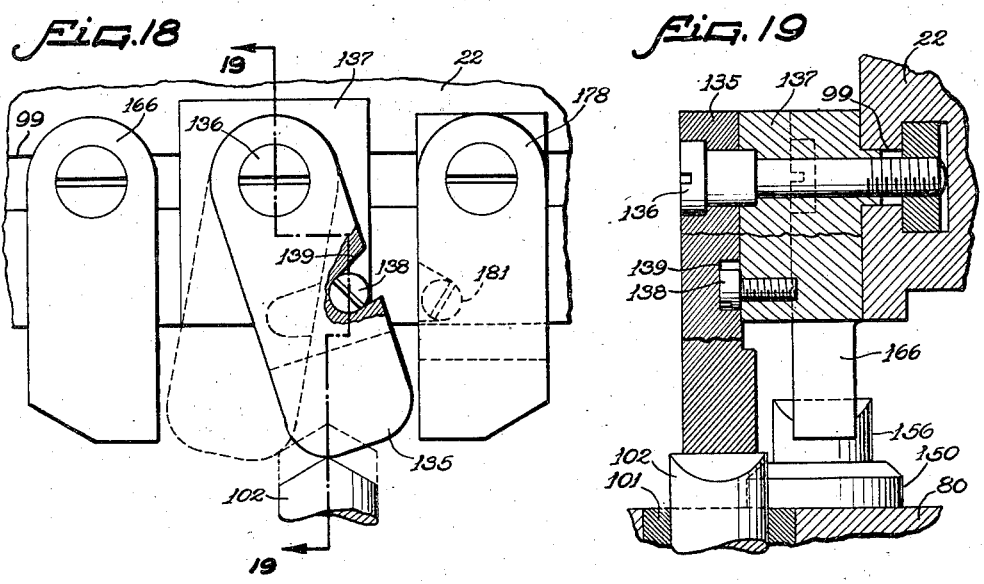
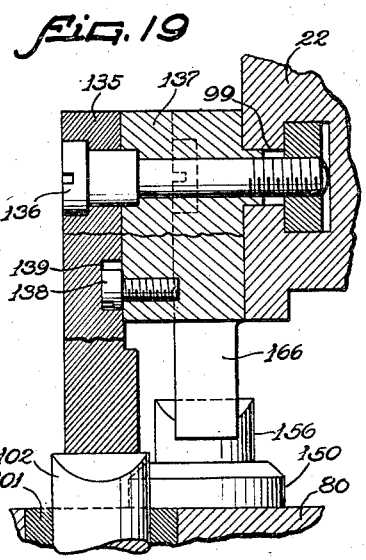
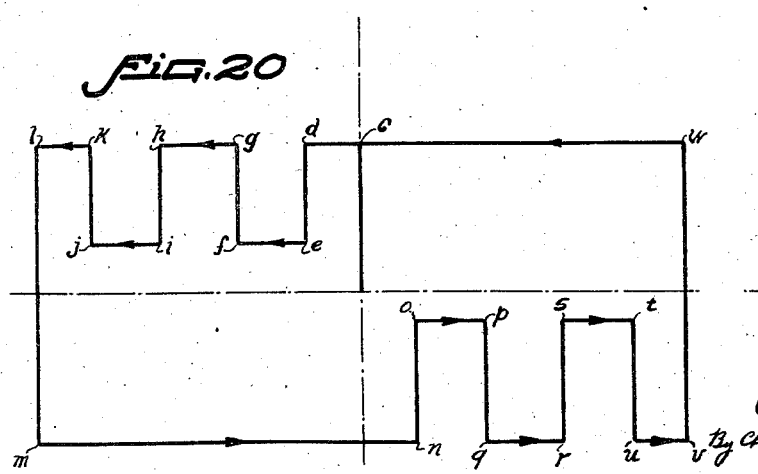
Inventor
Carroll R. Alden
By Chindahl, Parker & Carlson
Attorneys Patented May 7, 1935

2,000,553

UNITED STATES PATENT OFFICE 2,000,553

MACHINE TOOL

Carroll R. Alden, Detroit, Mich., assignor to Ex-Cell-O Aircraft & Tool Corporation, Detroit, Mich., a corporation of Michigan Application March 17, 1932, Serial No. 599,427

46 Claims. (Cl. 77—3)

The present invention relates to improvements in machine tools, and has particular reference to a new and improved diamond boring machine.

One of the important objects of the present invention is to provide a machine of novel and improved construction in which the work support is positioned between two or more opposed rotating tools, and in which there is means for effecting a relative movement of the support first into operative relation with the tool or tools at one side and then into operative relation with the tool or tools at the other side. This construction permits two work pieces on the support to be machined respectively by two opposed tools upon movement in opposite directions, and the removal and replacement of one work piece while the other is being machined.

Another object resides in the respective adjustment of the opposed tools to take a roughing cut and a finishing cut so that one or more work pieces upon relative movement of the work support in one direction may be given a roughing cut by one tool, and upon relative movement of the support in the opposite direction may be given a finishing cut by the opposed tool.

Further objects reside in the provision of novel means for automatically translating the work support relatively to the tools at a rapid traverse when the tools are not in operative engagement with the work and at a slow feed when one or more tools are in cutting engagement with the work, and for causing the feed during the finishing cut to be slower than during the roughing cut.

Another object is to provide a machine tool embodying one or more novel spindle supports, and a novel relation thereof to the slidable work support and the machine base.

A further object is to provide an improved unitary spindle structure.

Still another object of the invention is to provide new and improved means operable automatically in accordance with the movements of the work support to stop rotation of the tool spindle or group of tool spindles at either side while the tool spindle or group of tool spindles at the other side are in or are being brought into operative relation to the work support.

A further object resides in the provision of novel means for stopping rotation of all of the tool spindles whenever the work support regardless of its position or direction of movement is stopped.

Another object is to provide novel means automatically operable in accordance with the movements of the work support to supply coolant for the work to the tool or group of tools at either side while same are in operative relation to the support.

Further objects and advantages will become apparent as the description proceeds.

In the accompanying drawings, Figure 1 is a front view of a machine embodying the features of my invention.

Fig. 7 is a fragmentary longitudinal sectional view through the table drive taken along line 7—7 of Fig. 3.

Fig. 8 is a diagrammatic representation of the electric control circuits.

Fig. 9 is a diagrammatic representation of the hydraulic system for the table and spindle drives, showing the parts in the automatic stop position.

Fig. 10 is a view similar to Fig. 9, but showing the parts in the positions occupied to effect movement of the table to the left.

Fig. 17 is an enlarged fragmentary vertical sectional view taken along line 17—17 of Fig. 15.

Fig. 18 is a fragmentary view on an enlarged scale of the table control dogs.

Fig. 19 is a fragmentary sectional view taken along line 19—19 of Fig. 18.

Fig. 20 is a diagram illustrating the cycle of table movement.

Figure 1:
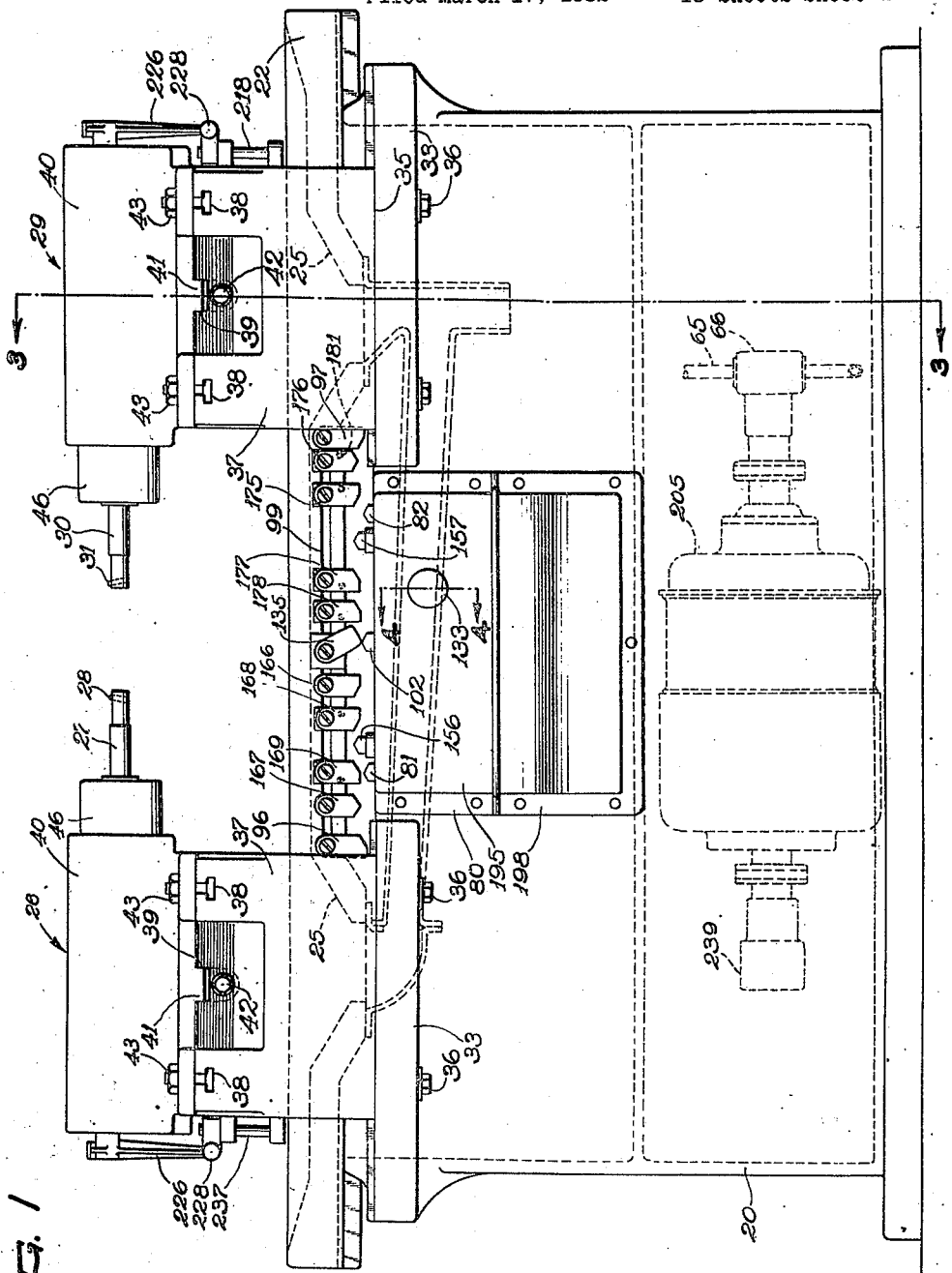
Figure 2:
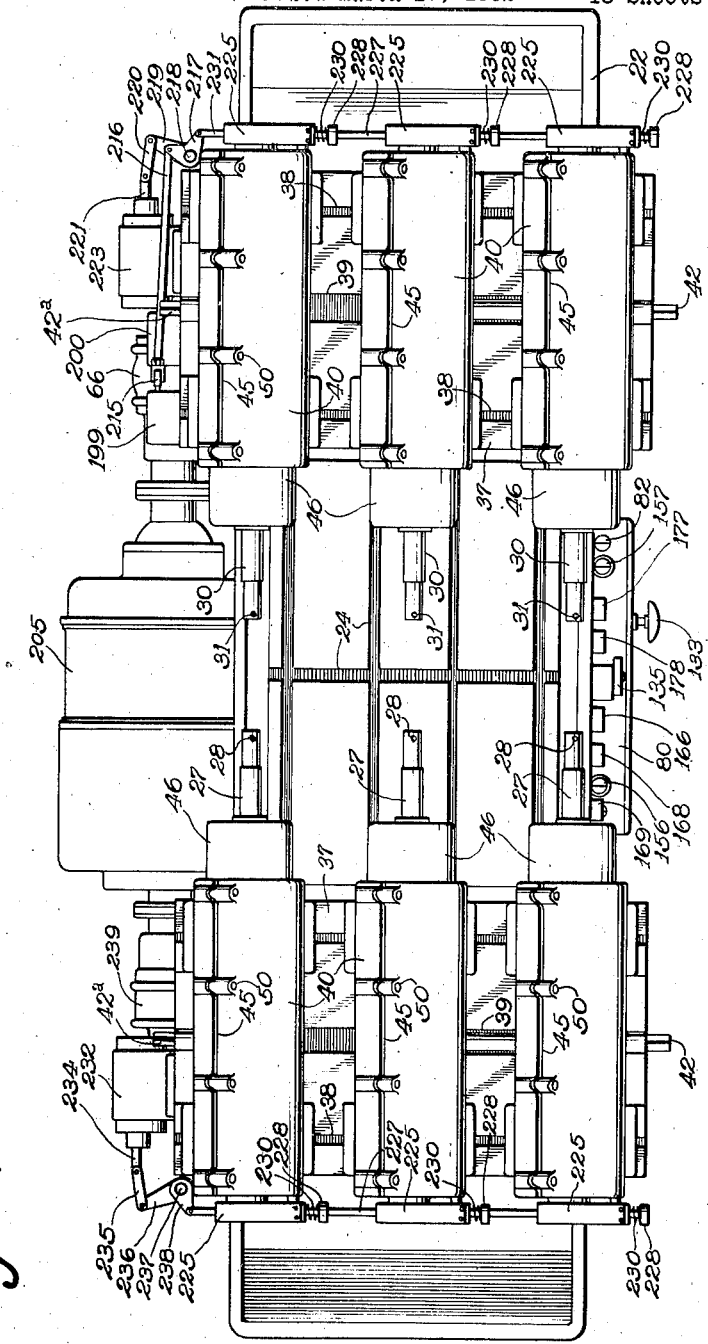
Fig. 2 is a plan view.

While the invention is susceptible of various modifications and alternative constructions, I have shown in the drawings and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

Referring more particularly to the drawings, the machine in its preferred form comprises an elongated hollow base 20. Formed on the top of the base 20 are two parallel spaced longitudinal ways 21, one of which is flat and the other of which is V-shaped. A table or carriage 22 is formed on the underside with ways 23 mounted on the ways 21 for horizontal translation or reciprocation. The table ways 23 are of such length that they never uncover the base ways 21 at the extreme ends of the table movement. Preferably, the table 22 is adapted to support the work to be machined, and hence is hereinafter designated as the work table. Hence, the table 22 has a flat upper mounting pad or surface formed with T-slots 24 for securing the work or work fixtures in position, and has coolant or water drains 25 at the ends.

Mounted on one end of the base 20 is a tool spindle supporting structure 26 in which one or more spindles 27, extending inwardly over the work table 20 and each provided with a suitable metal cutting tool 28, are journaled. A similar structure 29, rotatably supporting one or more spindles 30 extending inwardly over the other end of the table 22 and in respective alinement with the spindles 27 and each provided with a suitable metal cutting tool 31, preferably is mounted on the other end of the base 20 so that the table 22 upon movement in opposite directions between the structures may bring the work into cooperative relation alternately with the tools 28 and 31.

While the invention in its broad aspects is not limited to any specific type of machine tool, it is particularly adapted to and hence illustrated in connection with a horizontal diamond boring machine. Such machine is especially useful in accurately boring the wrist pin holes of engine pistons, the ends of connecting rods and the hubs of single or cluster gears. Accordingly, where roughing and finishing operations are to be performed, the finishing tools 31 are diamond fly tools while the roughing tools 28 may be carboloy (tungsten carbide) fly tools, and where only finishing operations are to be carried out, all the tools in use are diamond tools. However, in some instances, depending on the characteristics of the work to be cut, the finishing tools also may be of carboloy or other suitable material. The tools are mounted for radial adjustment in the free ends of the spindles 27 and 30 so that the desired dimension of revolution may be obtained.

In the present instance, three sets of axially alined spindles 27 and 30 are provided. Work pieces for one or more of these sets of spindles may be mounted on the work table 22. Considering any one set of opposed spindles 27 and 30, one or more work pieces may be mounted on the table 22. Thus, if two separate work pieces are positioned in proper alinement with the spindles 27 and 30, one piece may be machined upon movement of the table 22, in one direction, i. e. to the left into operative relation with the associated spindle 27, and the other piece may be machined upon movement of the table in the opposite direction. While one piece is being operated upon, the other finished piece may be replaced by a new piece so that the operation of the machine may be continuous.

An important feature of the invention resides in adjusting the fly tools 28 and 31 to take relatively different depths of cut, and so mounting the work and driving the work table 22 that upon movement of the table in one direction, one tool will take a roughing cut, and upon movement of the table in the opposite direction, the other tool will take a finishing cut. Either a single work piece or a plurality of alined work pieces may be operated on.

In the present instance, a single engine piston A, having two diametrically alined wrist pin holes B to be bored, and adapted to be mounted, as by means of a suitable fixture (not shown), on the table 22 between the tools 28 and 31 of each set, is illustrated in such position in Figs. 9 to 12. Movement of the table with the work to the left, causes the tool 28 to take a roughing cut in both holes B, and reverse movement of the table causes the tool 31 to take a finishing cut in both holes.

The two spindle supporting structures 26 and 29 (Figs. 1, 2, 3 and 5) preferably are alike in construction, and hence corresponding parts thereof will be designated by like reference characters. Provided on each end of the base 20, at the top and respectively along the front and rear walls, are two horizontal bridge rails 33 and 34. These rails are formed with ways 35, the front way being flat, and the rear way being V-shaped. Mounted on the ways 35 at each end of the base 20 and secured to the rails 33 and 34 as by means of bolts 36, so as to be in effect rigid with the base, is an inverted U-shaped bridge member 37 which spans the work table 22 transversely of the machine. The top surface of each bridge member 37 is formed along its ends with two parallel transverse T-slots 38, and intermediate the slots with a transverse cored groove 39, and is finished at opposite sides of the latter.

Figure 6:
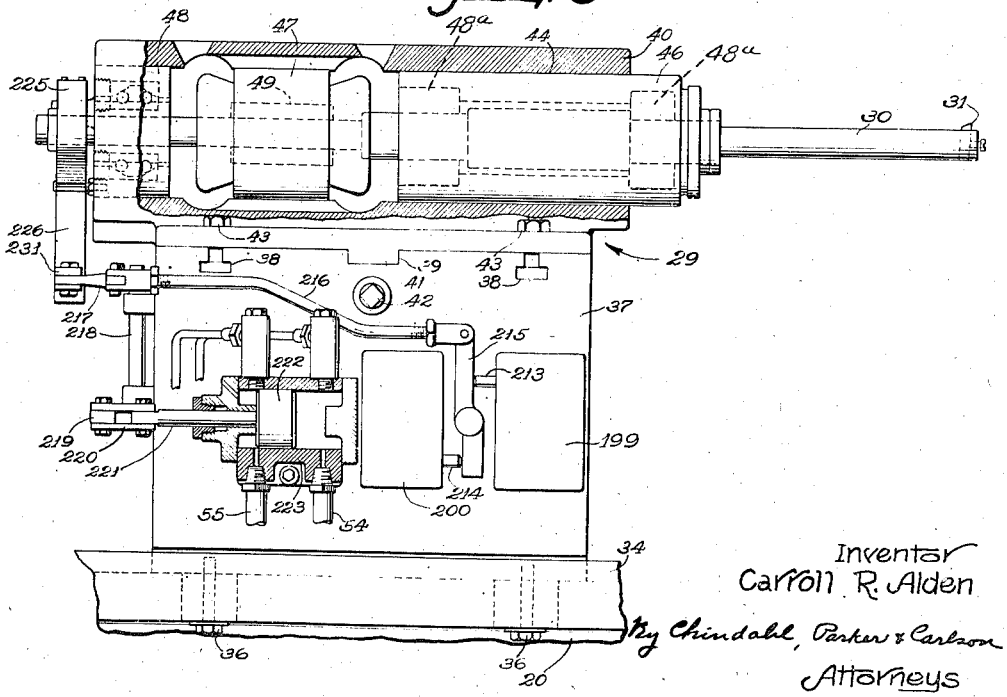
Fig. 6 is a fragmentary axial sectional view through one of the spindle fixtures taken along broken line 6—6 of Fig. 5.

Mounted on each bridge member 37 are three parallel spindle brackets 40 (Figs. 3 and 6) in which the spindles are suitably journaled. Each bracket 40 is provided on the underside with a transverse key or guide 41 which fits in the groove 39 and is accurately alined thereby. The brackets 40 are relatively adjustable along the T-slots 38 so as to obtain the desired lateral location and spacing of the fly tools. In the present instance, an adjusting screw 42 rotatably anchored in the underside of the front bracket 40 is in threaded engagement with the intermediate bracket, and a short adjusting screw 42ª rotatably anchored in the bridge member 37 is in threaded engagement with the rear bracket 40. Thus, by means of the screws 42 and 42ª the three spindle brackets 40 on each end may be spaced laterally in the desired relation, and may be accurately located or alined with respects to those on the other end. Suitable bolts 43 disposed in the T-slots 38 are provided for clamping the brackets 40 to the bridge member 37 in position of adjustment.

Each spindle bracket 40 is formed with a large longitudinal bore 44, finished throughout its length, and is split longitudinally as indicated at 45. Mounted in the bore 44 is a spindle body 46, a motor stator 47 and an outer bearing housing or sleeve 48. The latter projects from one end of the bore 44, and preferably houses two axially spaced bearings 48ª for the spindle. A rotor 49 is secured directly on the spindle within the stator 47. The parts are adapted to be clamped in position by means of a plurality of bolts 50, four in the present instance, in the bracket 40 for contracting the split margins of the bore 44.

In rigidly mounting the fast revolving spindles in fixed supports, and moving the work table 22 toward and from the cutting tools, a uniform tool spindle extension from the start to the finish of the cut, without side play, is obtained. It will be understood, however, that within certain aspects of the invention, it is immaterial as to which of the tools and the work is stationary and which is movable.

While the work table may be driven by any suitable means, preferably an hydraulic drive is provided. This drive is adapted to translate the work table 22 automatically at any desired variation of speeds, as for example at a rapid traverse whenever the tools are not taking a cut, a slow feed during a roughing cut and a still slower feed during a finishing cut, and is also adapted to maintain constant any predetermined feed regardless of variations in the cutting resistance.

The hydraulic motor (Fig. 7) comprises a cylinder 51 mounted below the work table 22 within the base 20. Reciprocably disposed within the cylinder 51 is a piston 52 supported by two piston rods 53 which extend slidably through the closed opposite ends of the cylinder 51. Preferably, the cylinder 51 is rigidly attached to the underside of the table 22, and the piston rods 53 are secured at their outer ends to the base 20. The opposite ends of the cylinder 51 are connected through the piston rods 53 respectively to two fluid conduits 54 and 55 leading to a direction valve 56 (Figs. 9 to 12).

Figure 3:
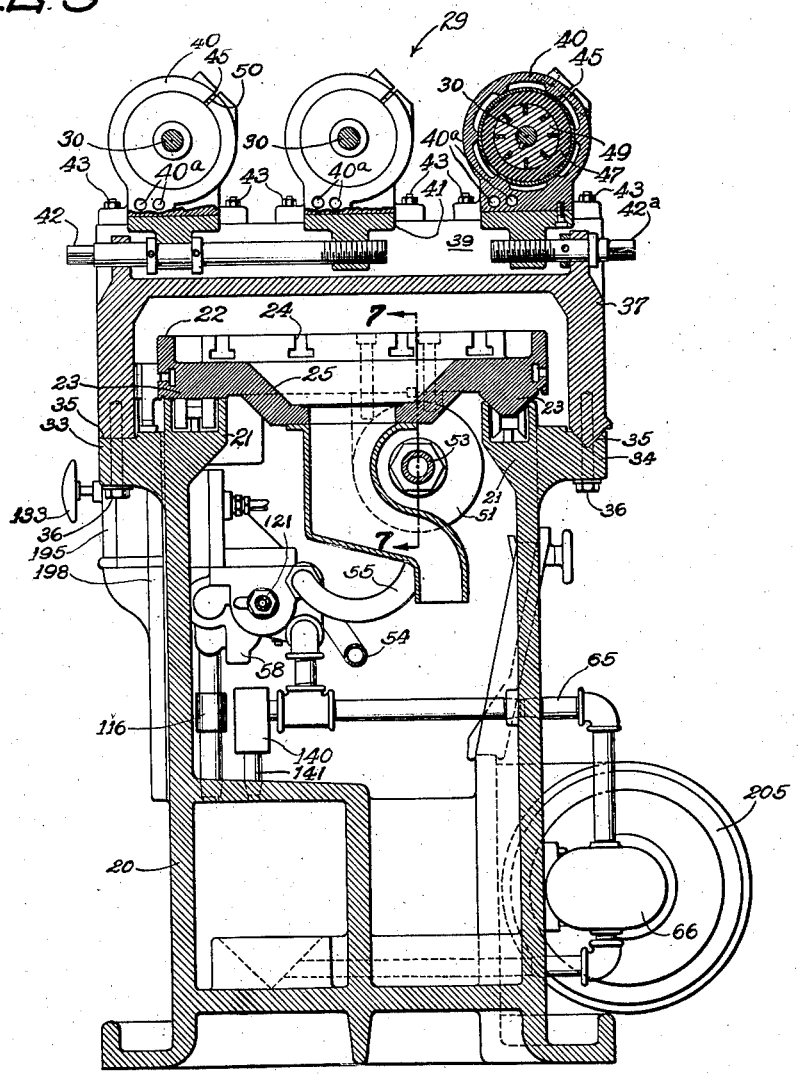
Fig. 3 is a transverse vertical sectional view taken along line 3—3 of Fig. 1.
Figure 15:
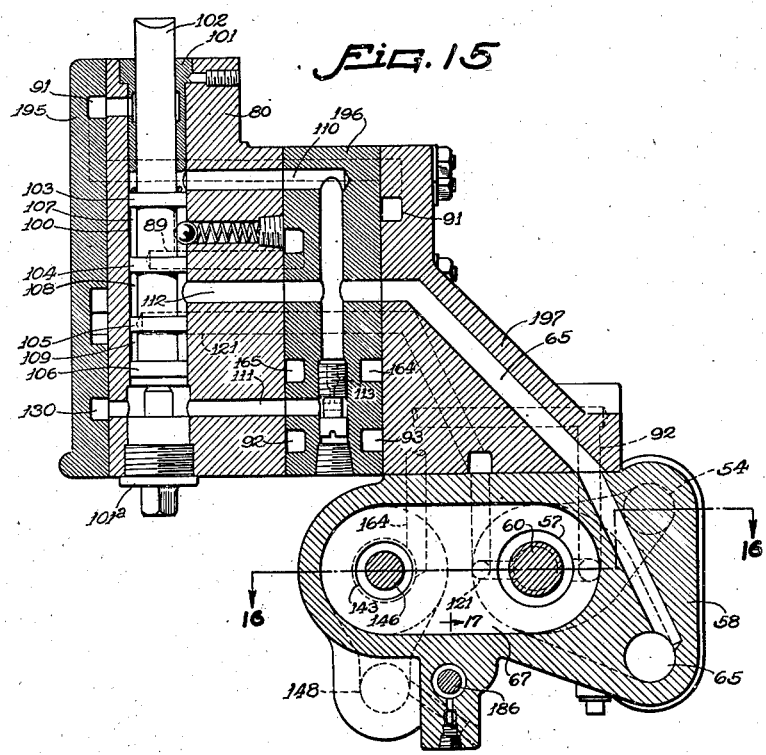
Fig. 15 is a transverse vertical sectional view taken along line 15—15 of Fig. 14.
Figure 16:
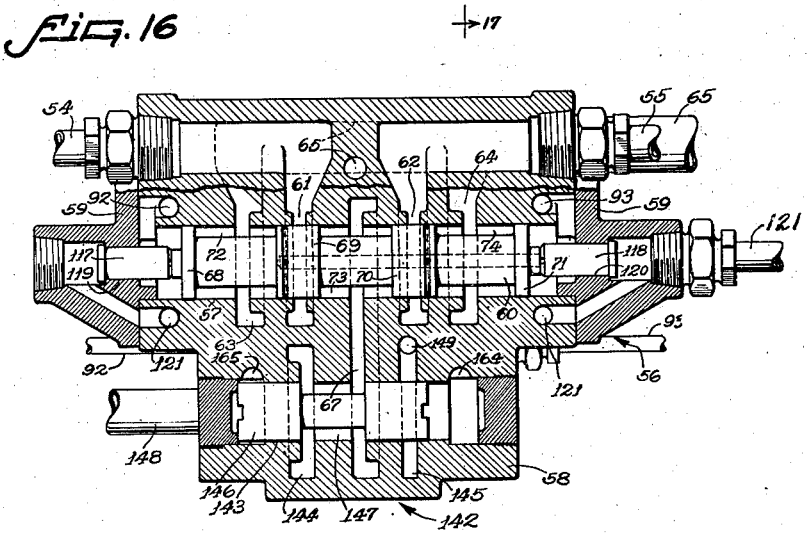
Fig. 16 is a horizontal sectional view taken along broken line 16—16 of Fig. 15.

The direction valve 56 (Figs. 15 and 16) may be of any desired construction, and preferably comprises an elongated cylinder bore or valve chamber 57 formed in a valve casing 58 and closed at the ends by means of plates 59 on opposite ends of the casing. A valve piston 60 of the spool type is mounted for reciprocation in the bore 57. Formed in the peripheral wall of the valve bore 57 are two axially spaced annular ports 61 and 62 connected respectively to the conduits 54 and 55. Two inlet ports 63 and 64 located respectively beyond the ports 61 and 62 are also formed in the valve bore 57, and are constantly connected through a pressure fluid supply conduit 65 to a suitable source of pressure fluid, such as a low pressure gear pump 66 (Fig. 3). Formed in the valve bore 57 intermediate the ports 61 and 62 is an annular exhaust port 67. The valve piston 60 is formed with four longitudinally spaced peripheral collars or heads 68, 69, 70 and 71 defining peripheral spaces 72, 73 and 74.

It will be evident that upon movement of the valve piston 60 to the left (Figs. 10 and 11), the space 74 will connect the ports 62 and 64 to supply pressure fluid to the conduit 55 leading to the left end of the table cylinder 51, and the space 73 will connect the ports 61 and 67 to establish communication of the conduit 54 from the right end of the cylinder 51 with the exhaust, thus instituting movement of the work table 22 to the left. Upon reversing the position of the valve piston 60 (Fig. 12), the spaces 72 and 73 will respectively connect the ports 61 and 63 and the ports 62 and 67 to reverse the connection of the conduits 54 and 55 so as to cause the work table 22 to travel to the right.

An automatic reset pilot mechanism responsive to the movements of the table 22 is provided for reversing the direction valve 56. The pilot mechanism comprises two valves 76 and 77 for effecting reversal of the work table 22 respectively to the left and right. The valves 76 and 77 (Figs. 9 to 12) respectively comprise vertical valve bores or chambers 78 and 79 (Fig. 13) which may be formed in any suitable casings and which in the present instance are formed in a plate or apron 80 secured to the front wall of the base 20. Slidably disposed in the respective valve bores 78 and 79 are two valve plungers 81 and 82 of the spool type formed respectively with spaced upper and lower peripheral collars or heads 83 and 84, and 85 and 86 defining annular spaces 87 and 88. The upper ends of the bores 78 and 79 above the collars 83 and 85 are constantly in communication with a branched conduit 89 adapted to be connected through a stop valve 90 either to the source of pressure fluid or the exhaust.

The bores 78 and 79, intermediate the collars 83 and 84, and 85 and 86, regardless of the positions of the plungers 81 and 82, are always in communication with the drain through a branched exhaust conduit 91. A cross conduit 92 opens at one end to the bottom of the bore 78, and at the other end to the side of the bore 79 adjacent the top for connection through movement of the head 85 either with the conduit 89 or the exhaust conduit 91. Likewise, a cross conduit 93 opens at one end to the bottom of the bore 79, and at the other end to the side of the bore 78 adjacent the top for communication through movement of the collar 83 either with the conduit 89 or the exhaust conduit 91. The cross conduits 92 and 93 also open respectively to the left and right ends of the main direction valve bore 57.

The bores 78 and 79 (Fig. 13) preferably open vertically through the plate 80, and are closed at their lower ends by plugs 94 and at their upper ends by sleeves 95 through which the upper ends of the plungers 81 and 82 slidably extend. It will be evident that the lower ends of the plungers 81 and 82 constitute differential pistons which will assume their uppermost positions when subjected to pressure fluid at both ends.

The upper outer ends of the plungers 81 and 82 are beveled to constitute reversing abutments adapted for engagement by suitable control dogs 96 and 97 with inclined faces mounted on the front of the work table 22. The dogs 96 and 97 are rigidly clamped in position by means of bolts 98 adjustably secured in a longitudinal T-slot 99 formed in the front of the table 22. The location and spacing of the dogs 96 and 97 on the table 22 is dependent on the desired extent and range of reciprocation.

Figure 11:
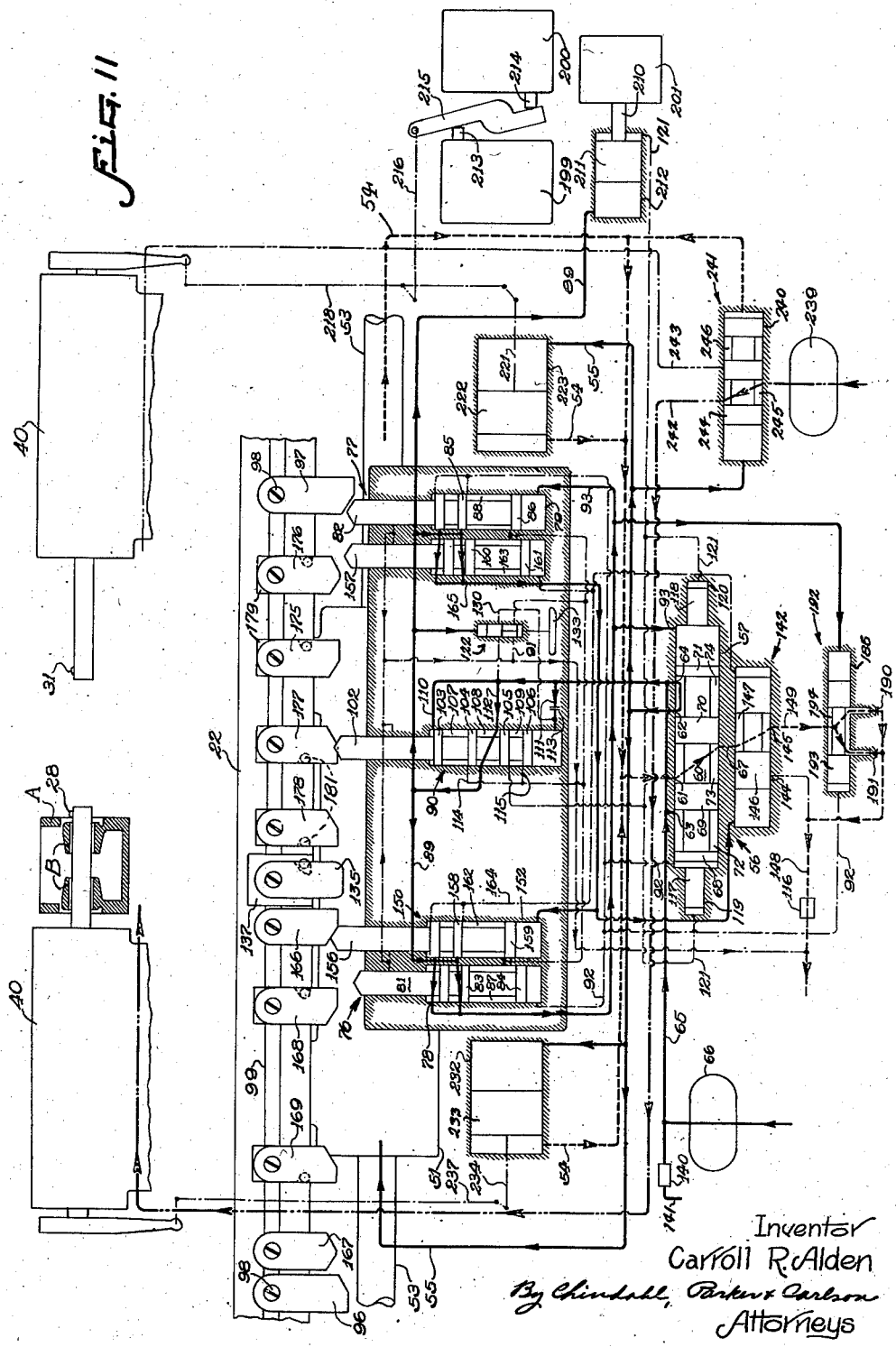
Fig. 11 is a view similar to Fig. 10, but showing the parts adjusted to effect a slow feed to the left.

Assuming that the stop valve 90 is adjusted to connect the conduit 89 to the source of pressure fluid (Figs. 10 to 12), and that the right-hand plunger 82 is in its uppermost position (Figs. 9 to 11), pressure fluid from the conduit 89 will then be transmitted through the upper end of the valve bore 78 and the cross conduit 93 to the lower end of the valve bore 79 and right end of the direction valve bore 57; and the lower end of the valve bore 78 and left end of the direction valve bore 57 will be connected through the conduit 92, the space 88 and the exhaust conduit 91 to the drain. Hence, the plunger 81 will occupy its lowermost position, and the valve piston 60 will be moved to the left to cause the table 22 to travel to the left (Figs. 10 and 11).

Figure 12:
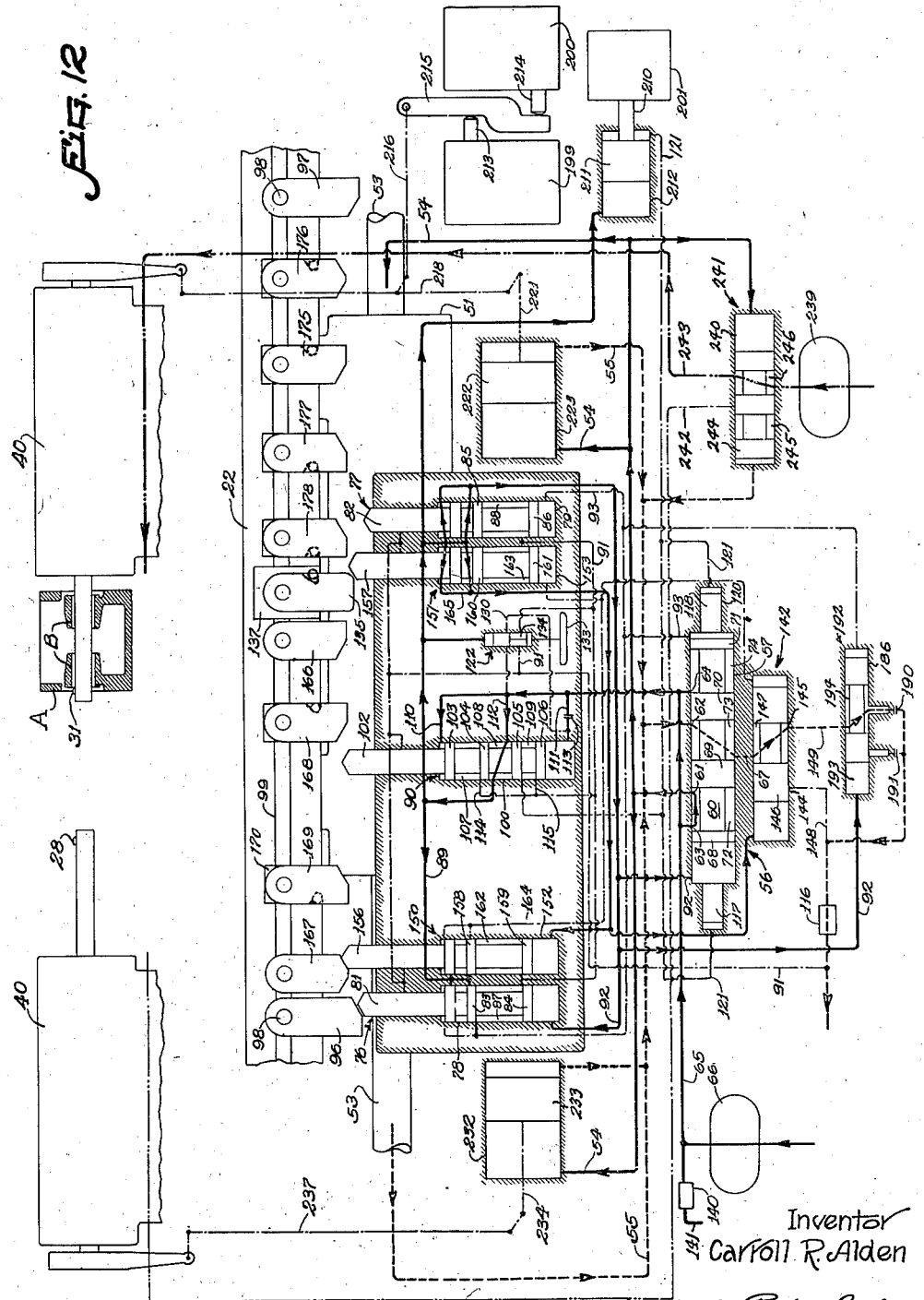
Fig. 12 is a view similar to Figs. 10 and 11, but with the parts adjusted to effect rapid traverse of the table to the right.
Figure 13:
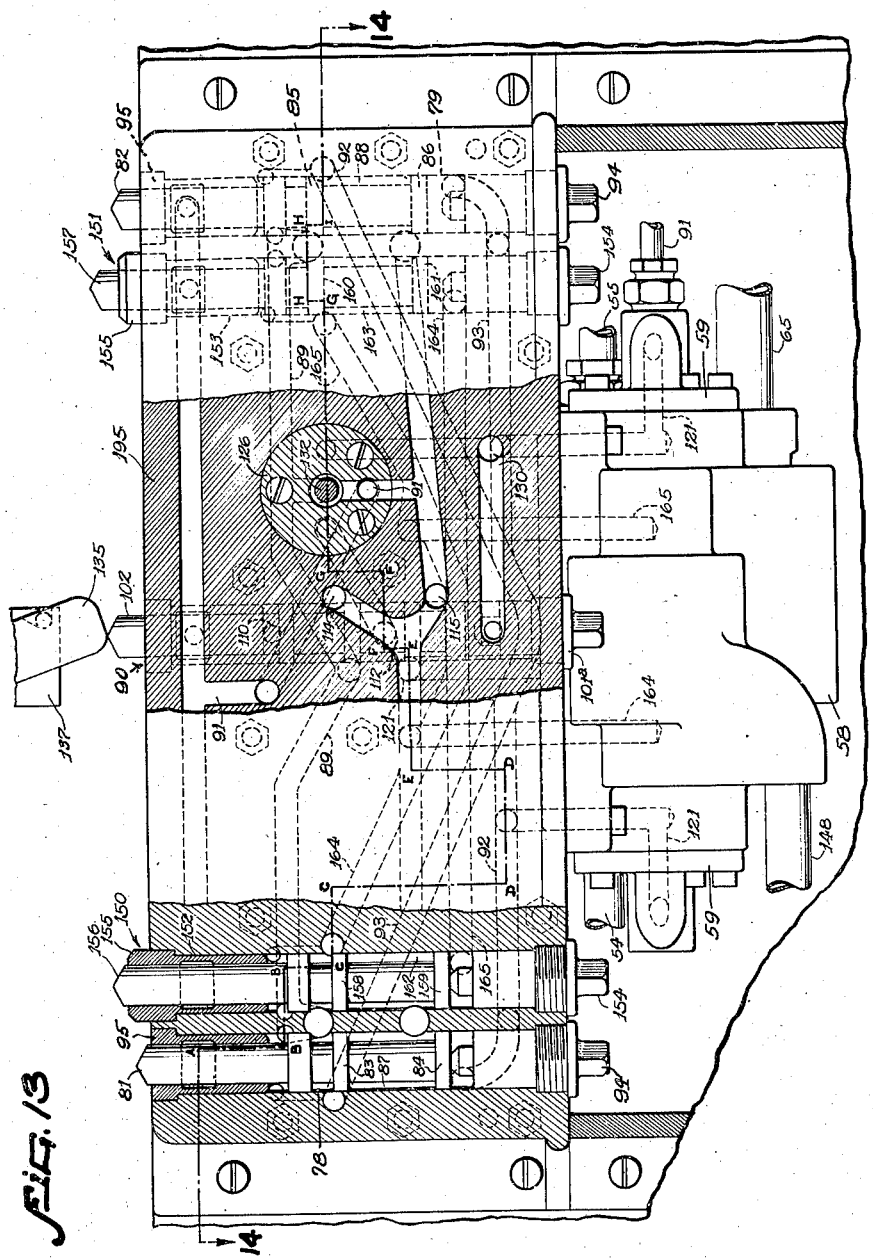
Fig. 13 is an enlarged fragmentary view, partially in section, of the hydraulic control panel.
Figure 14:
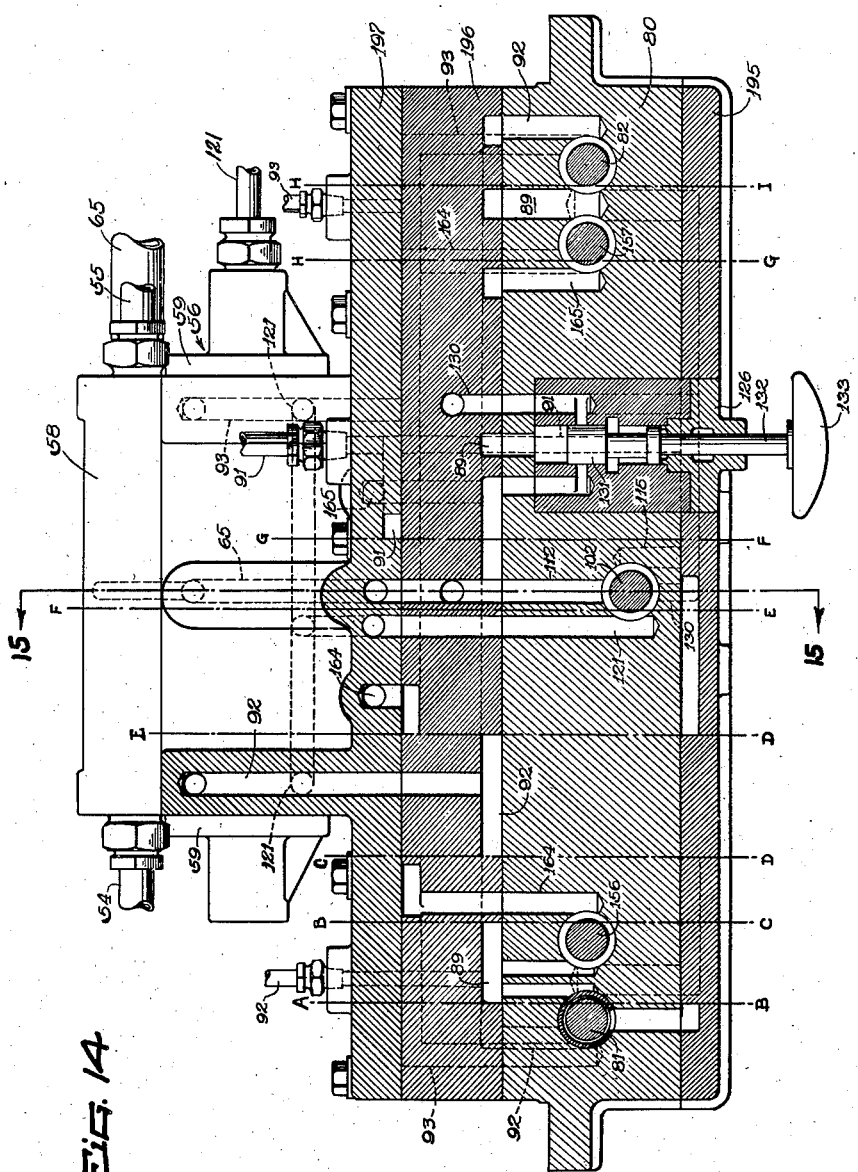
Fig. 14 is a composite horizontal sectional view of the panel taken along broken line 14—14 of Fig. 13.

As the table 22 reaches its extreme left position, the dog 97 depresses the plunger 82 (Fig. 11), thereby breaking the exhaust connection from the lower end of the bore 78 and the left end of the valve bore 57, and establishing a connection therefrom to the pressure conduit 89. Thereupon, the plunger 81 is elevated into operative position, thereby breaking the pressure connection to the lower end of the bore 79 and the right end of the valve bore 57, and establishing a connection therefrom to the exhaust. As a result, the valve piston 60 is moved to the right to reverse the movement of the table 22 (Fig. 12). Upon movement of the table 22 into its extreme right position, the dog 96 depresses the plunger 81, thereby reestablishing the initial connections and resetting the plunger 82.

The stop valve 90 (Fig. 15) is operable automatically or manually to interrupt the translation of the work table 22, and in its preferred form comprises a valve bore or chamber 100 opening vertically through the plate 80 between the valves 76 and 77, and closed at the bottom by a plug 101ᵃ and at the top by a sleeve 101. A valve plunger 102 of the spool type is reciprocably disposed in the bore 100, and extends upwardly through the sleeve 101 to the top of the plate 80. Formed on the plunger 102 are four longitudinally spaced peripheral collars or heads 103, 104, 105 and 106 which define three annular spaces 107, 108 and 109. The plunger 102 thus constitutes a differential piston which when subjected at both ends to the same pressure tends to assume its uppermost position.

The pressure supply conduit 65 is connected through three parallel branch conduits 110, 111 and 112 to the bore 100 respectively at the upper and lower ends and at an intermediate point. Interposed in the lower branch conduit 111 is a restricted orifice 113. The exhaust conduit 91 is connected through two parallel branch conduits 114 and 115 to the bore 100 at spaced points intermediate the conduits 110, 111 and 112. A back pressure valve 116 is interposed in the discharge end of the system ahead of the exhaust conduit 91 and back of the direction valve 56. The pressure conduit 89 for the pilot reset valves 76 and 77 is connected to the bore 100 at a point such that when the plunger 102 is in its uppermost position (Figs. 10 to 12), communication will be established therewith through the space 108 by the main supply conduit 65, and when the plunger is partially depressed (Fig. 9), communication therewith will be cut off. Obviously, fully lowering of the plunger 102 will connect the conduit 89 through the space 107 with the exhaust conduit 91, and will therefore cause the ends of the main valve bore 57 to be connected to the exhaust conduit 91 through the valves 76 and 77.

Pressure responsive means is provided for automatically centering the valve piston 60 when the occasion arises. This means (Fig. 16) comprises two centering pistons 117 and 118 slidably disposed respectively in two bores 119 and 120 formed in the end plates 59, and adapted to engage the ends of the piston 60 when urged inwardly. The outer ends of the bores 119 and 120 are connected to a branched conduit 121 which opens to the bore 100 at a point such that it will communicate through the space 109 with the exhaust conduit 91 when the plunger 102 is elevated (Figs. 10 to 12), and through the space 108 with the supply conduit 65 when the plunger 102 is depressed (Fig. 9). It will be evident that when the stop valve plunger 102 is depressed to connect both ends of the main valve bore 57 to the exhaust conduit 91, and simultaneously to connect the conduit 121 to the supply conduit 65, the impressed pressure fluid in the bores 119 and 120 will force the centering pistons 117 and 118 into their innermost positions, thus causing self-centering of the main valve piston 60 (Fig. 9) to interrupt the conduit connections to the table cylinder 51.

Figure 4:
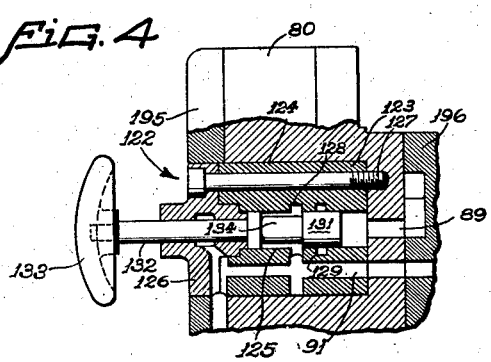
Fig. 4 is a fragmentary sectional view, taken along line 4—4 of Fig. 1, of the manual control valve.
Figure 5:
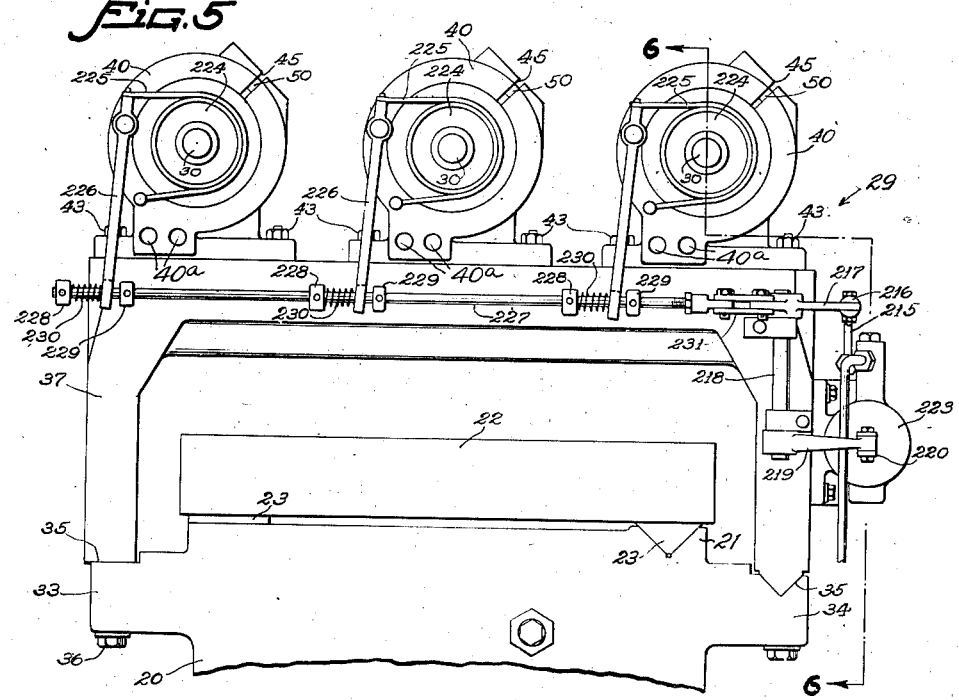
Fig. 5 is a fragmentary right end view.

Downward movement of the stop plunger 102 may be effected at will by means of a manual control which in the present instance consists of a hand valve 122 (Fig. 4). Preferably, the valve 122 comprises a cylindrical casing 123 which is fitted in a transverse recess 124, in the front side of the apron 80 and which has an axial valve bore 125. A plate 126 serves to close the front end of the bore, and the casing 123 and the plate 126 are secured in assembled relation and in position in the recess 124 by means of bolts 127. The bore 125 is connected at its inner end to the conduit 89, and is formed at spaced points along its length with annular ports 128 and 129 connected respectively to the exhaust conduit 91 and a conduit 130 opening into the lower end of the bore 100 beneath the stop plunger 102. A valve plunger 131 is slidably mounted in the bore 125, and has a stem 132 extending through the plate 126 and provided with an actuating knob 133. The plunger 131 is formed with a peripheral space 134 adapted either to connect or disconnect the conduits 91 and 130. Obviously, upon actuating the valve 122 to connect the conduits 91 and 130, the lower end of the bore 100 will be opened to the exhaust, and due to the orifice 113 a substantial pressure reduction will occur beneath the stop plunger 102, thereby causing the latter to descend to stop the work table 22. Upon actuating the valve 122 to disconnect the conduits 91 and 130, the supply pressure will again be established on the underside of the stop plunger 102, thus causing the latter to return upwardly into operative position.

Where a roughing cut and a finishing cut are to be taken upon movement of the work table 22 in opposite directions, it is desirable to provide means for automatically stopping the table upon movement thereof after the finishing cut into central or neutral position. This means (Figs. 18 and 19) comprises a pivotal drop pawl or dog 135 movable with the work table 22, and adapted to engage the upper beveled end of the stop plunger 102. The dog 135 is pivotally mounted by means of a bolt 136 on a plate 137 secured to the front of the table 22 for adjustment along the T-slot 99. A forwardly projecting pin 138 on the plate 137 is adapted for engagement in a slot 139 formed in the right side of the dog 135 to limit pivotal movement of the latter in that direction. The stop plunger 102 and the dog 135 are located forwardly out of range of the reverse plungers 81 and 82, and preferably for engagement midway of the work table 22.

It will be evident that the dog 135 is movable to the right past the stop plunger 102 without depressing the latter, but upon movement of the table 22 to the left into the neutral or loading position, will depress the plunger against the upwardly directed pressure differential to stop the table. The plunger 102 is not depressed into its lowermost position or sufficiently to release the dog, although the slight pivotal movement permitted by the pin 138 causes the pivotal center to be located to the left of the plunger. To again institute operation of the table 22, as for a succeeding cycle, the hand valve 122 is actuated manually to connect the conduits 91 and 130, thereby causing the plunger 102 to drop into its lowermost position. The dog 135 is thereby released and drops to the left of the plunger 102. The valve 122 is now actuated manually to effect return of the plunger 102 to operative position, whereupon the work table 22 is caused to move to the left and through another cycle.

The work table 22 is adapted to be driven automatically at variable speeds, for example at a rapid traverse when neither of the tools 28 and 31 is in operative contact with the work, and at a slow feed when either tool is in cutting engagement with the work. Thus, for the blank A, the table 22 is moved, as illustrated graphically in Fig. 20, wherein the ordinates represents the extent of the table movement to the left and right of the neutral position and the abscissas indicate the speed of travel to the left and right, through the following cycle: from the central starting position c to the left at a rapid traverse along c—d until the tool 28 is about to contact with the first hole B; at a slow feed along e—f while the hole B is being rough bored; at a rapid traverse along g—h while the tool 28 is crossing the space between the holes B; at a slow feed along i—j while the second hole B is being rough bored; at a rapid traverse along k—l just before reversal, then upon reversal to the right, at a rapid traverse along m—n until the tool 31 is about to contact with the first hole B; at a slow feed along o—p while the hole B is being finished bored; at a rapid traverse along q—r while the tool 31 is crossing the space between the holes B; at a slow feed along s—t while the second hole B is being finish bored; at a rapid traverse along line u—v until reversal; and finally upon a reversal to the left, at a rapid traverse along w—c to the initial starting position. It will be noted that on the final traverse in each direction, the tool is caused to move slightly beyond the work before reversal so as to afford time to stop the tool before commencing withdrawal past the center position. Preferably, the intermittent feeds to the right during the finishing cuts are somewhat slower than the corresponding roughing feeds to the left. While the table movements have been described as applied to a particular type of work piece, it will be understood that the programming of the table 22 may be varied to suit any desired problem without departing from the spirit and scope of the invention.

In the present instance, the impelling fluid pressure is maintained constant, as for example by means of a pressure relief valve 140 interposed in a branch conduit 141 from the main supply conduit 65 to the drain, and the speed control is obtained by automatically regulating the rate of discharge of pressure fluid from the exhaust end, at any particular time, of the table cylinder 51. The discharge of pressure fluid is so regulated that the speed of the work table 22 is maintained constant during any feeding movement regardless of variations in resistance.

The specific means for controlling the speed of the table movements comprises a speed valve 142 (Figs. 15 and 16) to which the exhaust fluid from the direction valve 56 is directed. The speed valve 142 preferably comprises a bore or chamber 143 which is formed in the casing 58 in parallel relation to the bore 57 and suitably closed at the ends. The exhaust port 67 of the main valve 56 opens in the peripheral wall of the bore 143 and constitutes the inlet port for the valve 142. Two annular discharge ports 144 and 145 are also formed in the bore 143 respectively at opposite sides of the port 67.

Reciprocably disposed in the bore 143 is a valve piston 146 of the spool type formed with an annular peripheral space 147 which is adapted upon movement of the piston respectively into opposite end positions to connect the inlet port 67 either to the discharge port 144 or the discharge port 145. The port 144 communicates with a substantially unrestricted discharge passage 148 connected to the exhaust conduit 91, while the port 145 is connected through a passage 149 with means hereinafter described for restricting the flow of fluid. It will be evident that with the piston 146 in its left-hand position, the table 22 will be movable at a rapid traverse, and that with the piston 146 in the opposed position, the table will be movable at a slow feed.

A reset pilot mechanism (Fig. 13) consisting of a traverse valve 150 and a slow feed valve 151 is provided for automatically actuating the piston 146 of the speed valve 142. The valves 150 and 151 preferably are built into an integral structure with the reverse and stop valves 76, 77 and 90, and hence respectively comprise vertical bores or chambers 152 and 153 opening through the plate 80. Of the bores 152 and 153, the lower ends are closed by plugs 154 and the upper ends are closed by sleeves 155. Slidably disposed in the respective bores 152 and 153 and extending upwardly through the sleeves 155 are two valve plungers 156 and 157 of the spool type formed respectively with longitudinally spaced peripheral collars or heads 158 and 159, and 160 and 161, defining annular spaces 162 and 163. The upper ends of the plungers 156 and 157 above the plate 80 are beveled to constitute abutments alternately responsive to the movements of the work table 22.

The pressure conduit 89 opens to the upper ends of the bores 152 and 153 so that pressure fluid acts constantly on the upper heads 158 and 160. The exhaust conduit 91 opens to the bores 152 and 153 constantly in communication with the spaces 162 and 163 for all positions of the plungers 156 and 157. A cross conduit 164 opens from the bore 152 adjacent the upper end to the lower end of the bore 153 and right end of the speed valve bore 143, and is adapted to be brought into communication either with the pressure conduit 89 or the exhaust conduit 91 upon movement of the plunger 156 respectively into its lowermost or uppermost position. Likewise, a cross conduit 165 opens from the bore 153 adjacent the upper end to the lower end of the bore 152 and the left end of the speed valve bore 143, and is adapted to be connected either with the high pressure conduit 89 or the exhaust conduit 91 upon movement of the plunger 157 respectively into its lowermost or uppermost position.

The plungers 156 and 157 by reason of their upwardly projecting ends constitute differential pistons which will seek their uppermost positions when both ends are subjected to the high pressure in the conduit 89. It will be evident, that when the traverse plunger 156 is depressed, high pressure will be transmitted to both ends of the bore 153 and to the right end of the valve bore 143, thus positioning the valve piston 146 (Figs. 9 and 10) to effect rapid traverse of the work table 22 in a direction depending on the valve 56. The plunger 157 will occupy its uppermost position, thereby connecting the lower end of the bore 152 and the left end of the valve bore 143 to the exhaust conduit 91. If the feed plunger 157 is now depressed, the pressure conduit 89 will be connected to the lower end of the bore 152 and the left end of the bore 143. Thereupon the traverse plunger 156 will be reset into operative position, and therethrough will connect the lower end of the bore 153 and the right end of the bore 143 to the exhaust conduit 91 so as to establish the plunger 157 in its lowermost position and effect movement of the piston 146 to the right (Figs. 11 and 12).

A plurality of dogs are mounted on the table 22 for actuating the plungers 156 and 157. Obviously, the dogs may be varied in number and location to obtain the desired table movements for a given problem. In the present instance, two fixed dogs 166 and 167 are mounted on the front of the table 22, for adjustment along the T-slot 99, in position to depress the traverse plunger 156 substantially simultaneously with each reverse of the table movement 22 at the extreme limits of reciprocation. Two drop dogs 168 and 169, pivotally mounted respectively on plates 170 adjustably secured to the front of the table 22 along the T-slot 99, are located between the dogs 166 and 167, and are adapted respectively to depress the traverse plunger 156 to institute rapid traverse of the table 22 while the tools 28 and 31 successively are crossing the space between the holes B of the work piece A.

The dog 168 is limited against pivotal movement to the right past vertical position through engagement of a slot 171 therein with a pin 172 on its plate 170, but is free to pass over the plunger 156 upon movement with the table 22 to the right. Likewise, the dog 169 is limited against pivotal movement to the left past vertical position through engagement of a slot 173 therein with a pin 174 on its plate 170, but is free to flip over the plunger 156 upon movement with the table 22 to the left.

Four additional drop dogs 175, 176, 177 and 178 are pivotally mounted respectively on plates 179 adjustably secured to the front of the table 22 along the T-slot 99 and between the reversing dog 97 and the stop dog 135. The two dogs 175 and 176 on the right have pin and slot connections 180 with the respective plates 179 preventing pivotal movement to the right past the vertical, and are adapted to successively depress the feed plunger 157 upon movement of the table 22 to the left to institute the slow feed while the tool 28 is operating in the work holes B. The two dogs 177 and 178 on the left have pin and slot connections 181 with the respective plates 179 limiting pivotal movement past the vertical to the left, and are adapted to depress the feed plunger 157 upon movement of the table to the right to effect a slow feed successively for engagement of the tool 31 with the holes B in the work A.

To provide means for restricting the discharge of exhaust fluid from the valve 142, so as to reduce the speed of the work table 22, the discharge passage 149 is adapted to be connected through an orifice or various combinations of orifices to the exhaust passage 148. To this end, a plurality of chambers or bores 182 (Fig. 17), two in the present instance, are formed in the bottom of the casing 58. The chambers 182 are interconnected by a passage 183 which is connected to the exhaust passage 148. The inner ends of the chambers 182 are connected respectively through spaced passages 184 and 185 to a transverse chamber or bore 186 which is formed in the casing 58 and is connected centrally through the passage 149 to the port 145. Adjustably threaded into the chambers 182 are two heads 188 provided with upstanding pins 189 extending across the passages 184 and 185 to define therewith restricted orifices 190 and 191.

It will be evident that fluid discharged from the port 145 in passing through one or both of the orifices 190 and 191 will be subjected to the flow law of orifices, and will therefore build up a back pressure checking the speed of the table 22 to a predetermined point. The pressure varies as the square of the volume of the fluid flowing through the orifices, and hence increased flow cannot take place unless the rate of travel of the table 22 is increased. The velocity of fluid flow through the orifices thus is proportional to the rate of travel of the table 22. The orifices serve to prevent any appreciable fluctuations in the predetermined slow speed of the table 22 otherwise tending to result from variations in resistance to the cutting action. It will be evident that the rate of feed is dependent upon the sizes of the orifices employed, and that different rates of feed may be obtained by selectively varying the number of orifices, of the same or different sizes, connected in parallel at any one time. Obviously, the number, sizes and combinations of orifices can be indefinitely multiplied to obtain a wide and finely graduated range of feed adjustments.

Preferably, a slower feed is employed during the finishing cuts than during the roughing cuts. The orifice 190 which is intended to produce the slowest feed that may be desired in either direction of table travel is constantly connected to the discharge port 145. To obtain a slightly faster feed during the roughing cut, the restricted orifice 191 is brought automatically into parallel with the orifice 190 (Figs. 9 to 11). The connection of the orifice 191 into or out of communication with the port 145 is automatically controlled by means of an orifice control valve 192 (Fig. 17) which comprises a valve piston 193 slidably disposed in the bore 186. The piston 193 is formed with a peripheral annular space 194 always establishing communication between the passages 149 and 184, and adapted when in its left-hand position also to connect the passage 185 with the passage 149 so as to obtain a faster feed.

The piston 193 is automatically moved from one position to the other upon each reversal of travel of the table 22. The pressure impulses are supplied through the conduits 92 and 93 which open respectively to the left and right ends of the bore 186. Thus, when the reverse plunger 81 is depressed to institute movement of the table 22 to the left, pressure fluid is supplied to the conduit 93 and acts to move the piston 193 to the left, thereby cutting in the orifice 191, to obtain a relatively fast feed during the roughing stroke (Fig. 11). Conversely, upon depressing the plunger 82 to reverse the movement of the table 22 to the right, the conduit 93 is connected to the exhaust conduit 91, and pressure fluid is supplied to the conduit 92 and acts to move the piston 193 to the right, thereby cutting out the orifice 191 to obtain a slow finishing feed (Fig. 12).

Preferably, the plate or apron 80 constitutes a control panel secured in the front wall of the base 20. Cover plates 195 and 196 are secured to the front and rear faces of the panel 80. A bracket 197 supporting the casing 58 on its underside is secured against rear or inside face of plate 196. The passages serving the various valve units are formed mainly in the contacting surfaces of the parts 80, 195, 196, 197 and 58. Thus all of the valves are built into an integral hydraulic structure which may be readily demounted as a unit from the machine by merely removing the plate 80. A cover plate 198 is secured to the base below the plate 80 to enclose the casing 58.

To prevent withdrawal of the tools from causing spiral marks in or otherwise marring the bored surfaces, the spindles 30 are stopped and braked during movement of the table 22 to the left, and the spindles 27 are stopped and braked during movement of the table to the right.

Rotation of the spindles 27 and 30 is controlled respectively by a normally open switch 199 and a normally closed switch 200, and by a master switch 201. The details of these switches form no part of the present invention, and are therefore not specifically described. A manually controlled switch 201ª is adapted to connect mains L1, L2, and L3 (Fig. 8) to lines 202, 203 and 204 leading to the switches 199 and 200 and also to a motor 205 mounted on the rear of the machine for driving the pump 66.

The switch 199 controls a circuit from the line 203 to the line 204 including a solenoid 206. When energized, the solenoid 206 serves to close a switch 207 to connect the lines 202, 203 and 204 to the driving motors 47, 49 for the spindles 27 at the left end of the machine. Likewise, the switch 200 is adapted to close a circuit from the line 203 to the line 204 including a solenoid 208. Upon being energized, the solenoid 208 is adapted to close a switch 209 for connecting the lines 202, 203 and 204 to the driving motors 47, 49 for the spindles 30 at the right end of the machine.

The master switch 201 is interposed in the circuit between the line 203 and the switches 199 and 200, and is adapted to be controlled automatically, i. e. to be closed when the table 22 is set into operation and opened when the table is stopped. Thus, the switch 201 has an actuating stem 210 adapted to assume either an "on" or "off" position. The actuating stem 210 is secured to a piston 211 slidably disposed in a cylinder 212 mounted on the rear of the base 20 of the machine. Opposite ends of the cylinder 212 are connected to the conduits 89 and 121. It will be seen that when the stop plunger 102 is lowered to stop movement of the table 22 (Fig. 9), pressure fluid will be supplied through the conduit 121 to the right end of the cylinder 212, and the other end of the cylinder will be connected through the conduit 89 to the exhaust, so as to move the piston 211 into the "off" position, thereby stopping the motors for the spindles 27 and 30, and that upon movement of the stop plunger 102 into its operative position to connect the conduits 89 and 121 respectively to the pressure side of the system and the exhaust, the piston 211 will occupy its "on" position to permit operation of the spindles 27 and 30.

The spindle switches 199 and 200 (Fig. 6) respectively for the left-hand and right-hand groups of spindles 27 and 30 have actuating stems 213 and 214 and are mounted at opposite sides of and with the stems in engagement with opposite ends of a lever 215 pivotally mounted intermediate its ends on the rear of the base 20. One end of the lever 215 is connected through a link 216 to one arm of a bell-crank lever 217 on a vertical rock shaft 218 mounted on the outer end of the right-hand bridge member 37. The shaft 218 has a crank arm 219 connected through a link 220 to a rod 221. Secured to the rod 221 is a piston 222 slidably disposed in a cylinder 223 mounted on the rear of the bridge member 37. Opposite ends of the cylinder 223 are connected to the conduits 54 and 55. Thus, upon instituting movement of the table 22 to the left, the piston 222 will be moved to the left as viewed in Figs. 9 to 11, thereby rocking the shaft 218 to open the switch 200 and close the switch 199. Thereupon, the left-hand group of spindles 27 will be in operation, and the right-hand group of spindles 30 will be idle. Upon movement of the table 22 to the right, the switch 200 will be closed and the switch 199 will be opened to effect operation of the spindles 30 and stop operation of the spindles 27.

The braking mechanism in its preferred form (Figs. 2, 5 and 6) comprises a brake drum 224 on the outer end of each of the spindles 27 and 30. A brake band 225 anchored at one end to the associated spindle bracket 40 embraces the drum 224 and is secured at its other end to the upper end of a vertical lever 226 pivoted intermediate its ends on the associated spindle bracket. The lower end of the lever 226 is forked, and the forks of the three levers on each end of the machine are laterally alined. Extending slidably through the forks of each set of levers 226 is an actuating rod 227. Two spaced collars 228 and 229 are secured on each rod 227 at opposite sides of each lever 226. A coiled compression spring 230 is disposed on each rod 227 in end abutting engagement with the foremost collar 228 and the lower end of the associated lever 226. Thus, upon moving either rod 227 rearwardly, pressure will be stored in the associated springs 230 and the latter will thereupon actuate the associated levers 226 to apply a braking action to the associated set of spindles 27 or 30.

The shifter rod 227 on the right end is actuated in opposite directions in accordance with the actuation of the switches 199 and 200, from the piston and cylinder unit 222, 223, so as to brake the set of spindles 30 when the table 22 is traveling to the left. Thus, the rear end of the rod 227 is connected through a link 231 to one arm of the bell-crank lever 217. Preferably, the rod 227 on the left end is operable by a separate hydraulic unit (Fig. 2) comprising a cylinder 232 in parallel with the cylinder 222 and a piston 233 disposed therein. The piston 233 is operatively connected through a rod 234, a link 235, a crank arm 236, a rock shaft 237 and a crank arm 238 to the front end of the left hand rod 227. It will thus be evident that when the table 22 is impelled to the left (Figs. 9 to 11), the pistons 222 and 232 will each occupy its left-hand position so as to brake the spindles 30 on the right end of the machine, and to release the spindles 27 on the left end of the machine. Conversely, upon movement of the table 22 to the right (Fig. 12), the pistons 222 and 232 will occupy their right-hand positions to brake the spindles 27 on the left end of the machine and to release the spindles 30 on the right end of the machine.

Another feature of the invention resides in providing coolant to the spindles during their operation. The coolant from any suitable source (not shown) is supplied to a pump 239 preferably of the gear type which is driven by the motor 205 and which discharges to the cylinder 240 of a coolant valve 241 (Fig. 9). Opening in spaced relation from the cylinder 240 are two coolant conduits 242 and 243 leading respectively to the spindles 27 and 30 at opposite ends of the machine. The conduits 242 and 243 are connected to cored passages 40ª in the spindle brackets 40. The coolant in flowing through these passages serves to maintain the spindle bearings at a substantially constant temperature, thereby insuring accuracy and precision during the cutting operation. A valve piston 244 of the spool type formed with two longitudinally spaced peripheral recesses 245 and 246 is slidably disposed in the valve cylinder 240. Upon movement of the piston 244 in opposite directions the recesses 245 and 246 are adapted to connect the coolant pump 239 alternately to the conduits 242 and 243. Opposite ends of the cylinder 240 are connected to the conduits 54 and 55.

Thus, when in the operation of the machine, either set of the spindles 27 or 30 is idle, the valve 241 cuts off the supply of coolant thereto, and supplies coolant to the other set of spindles.

Recapitulating, it will be noted that the two sets of spindles 27 and 30 are alternately brought into operation, either to machine certain work pieces while others are being replaced, or to successively produce a roughing cut and a finish cut. In the last instance the table 22 is automatically stopped after each cycle to permit reloading. Even in the first instance, it would be desirable to stop the table after each cycle so as to insure safety to the operator. Obviously, the dog 186 is adjustable to stop or permit continuous operation of the table, and also to determine the point at which stopping will occur.

The hydraulic system controls all of the operating accessories, such as the spindle drives, the spindle brakes, and the coolant supply in accordance with the table movements. Thus, if the table 22 is brought to rest, the master switch 201 is opened, thereby breaking the circuits to all of the spindle motors. If the table 22 is traveling to the left, the spindles 27 are operated and coolant is supplied thereto, but the spindles 30 are inoperative and braked and no coolant is supplied thereto. Upon movement of the table 22 to the right, the foregoing conditions are reversed.

Movement of the table as to direction and speed is under the control of selective dog actuated reset pilot mechanisms which are accurate, efficient and reliable in operation, and which are simple and compact in construction. Whenever either of the two actuators of each pilot mechanism is operated, the other actuator is automatically reset into position to assume control. By controlling the speed of travel of the table 22 through the rate of flow of the discharge fluid, a smooth and uniform operation is obtained. The orifice control, including the valve 192, affords means for varying the rate of feed in either direction to suit the depth of cut to be taken. The hydraulic system is highly flexible and adaptable.

The hydraulic operating system herein disclosed for the carriage 22 forms the subject matter of my divisional application Serial No. 690,525, filed September 22, 1933.

I claim as my invention:

1. In a machine tool, in combination, an elongated base having longitudinal ways on the top, a work carriage mounted on said ways for reciprocation longitudinally of said base, said carriage being greater in length than said ways to fully overlie said ways in all positions of reciprocation, means for reciprocating said carriage, two inverted U-shaped bridge members rigidly mounted respectively on the opposite ends of said base and spanning said carriage, two sets of parallel elongated spindle brackets mounted respectively on said bridge members, said brackets extending longitudinally of said base and being adjustable laterally thereof and adapted to be arranged in pairs of opposed longitudinally alined brackets, means for securing said brackets rigidly in position of adjustment, a plurality of tool spindles one journaled longitudinally in each bracket, and a plurality of electric motors one connected to each spindle and mounted co-axially therewith in the associated bracket.

2. In a machine tool, in combination, an elongated base having longitudinal ways on the top, a work carriage mounted on said ways for reciprocation longitudinally of said base, said carriage being greater in length than said ways to fully overlie said ways in all positions of reciprocation, means for reciprocating said carriage, an inverted U-shaped bridge member rigidly mounted on said base and spanning said carriage, a plurality of parallel elongated spindle brackets mounted on said bridge member, said brackets extending longitudinally of said base and being adjustable laterally thereof, means for securing said brackets rigidly in position of adjustment, a plurality of tool spindles one journaled longitudinally in each bracket, and a plurality of electric motors one connected to each spindle and mounted on the associated bracket.

3. In a machine tool, in combination, a base having horizontal ways, a carriage movable on said ways, parallel horizontal side rails on said base outside of said ways, an elevated bridge member extending in spaced relation over said ways and said carriage and having depending legs resting on said rails, the top of said member having a transverse guideway, three spindle brackets mounted on said member for relative lateral adjustment along said guideway, an adjusting screw rotatably connected to one bracket and in threaded engagement with another bracket, and an adjusting screw rotatably anchored on said member and in threaded engagement with the third bracket.

4. In a machine tool, a unitary spindle structure fixture having, in combination, an elongated bracket having a continuous generally cylindrical bore split longitudinally, securing means for contracting said bore peripherally along said split, bearing sleeves fitted within opposite ends of said bore, a spindle journaled in said sleeves, and an electric drive motor for said spindle, said motor comprising a stator secured within said bore between said sleeves and a rotor in said stator secured to and co-axial with said spindle.

5. In a machine tool, a spindle fixture having, in combination, an elongated bracket, axially spaced bearing sleeves in said bracket, a spindle journaled in said sleeves and projecting from one end of said bracket, said bracket being formed internally with cooling passages, means for circulating a cooling medium through said passages, and an electric motor on said spindle in said bracket between said sleeves, said bracket being air vented about said motor.

6. In a machine tool, in combination, a base, two axially alined spindles, means on said base rotatably supporting said spindles in spaced relation, means for driving said spindles, two cutting tools mounted respectively on the adjacent ends of said spindles and projecting beyond the periphery thereof, one of said tools describing a lesser circle of revolution than the other of said tools, a work support on said base in part between said spindles for relative reciprocation longitudinally of said spindles, each full reciprocation comprising first a roughing stroke relatively toward and in cooperative relation with said one tool and then a finishing stroke relatively toward and in cooperative relation with said other tool, drive means for effecting said relative reciprocation, and control means responsive to said reciprocation for automatically adjusting said drive means to effect a slower feed during said finishing stroke than during said roughing stroke.

7. In a machine tool, in combination, a base, two axially alined spindles, means on said base rotatably supporting said spindles in spaced relation, means for driving said spindles, two cutting tools mounted respectively on the adjacent ends of said spindles and projecting beyond the periphery thereof, one of said tools describing a lesser circle of revolution than the other of said tools, a work support on said base in part between said spindles for relative reciprocation longitudinally of said spindles, each full reciprocation comprising first a roughing stroke relatively toward and in cooperative relation with said one tool and then a finishing stroke relatively toward and in cooperative relation with said other tool, and hydraulic drive means for effecting said relative reciprocation, said drive means being automatically operable to relatively stop said support in a neutral position between said spindles after one complete reciprocation.

8. In a machine tool, in combination, a base, two axially alined spindles, means on said base rotatably supporting said spindles fixedly in spaced relation, means for driving said spindles, two cutting tools mounted respectively on the adjacent ends of said spindles and projecting from the periphery thereof, one of said tools describing a lesser circle of revolution than the other of said tools, a work carriage mounted on said base in part between said spindles for reciprocation longitudinally of said spindles, and drive means for reciprocating said carriage, each full reciprocation comprising first a roughing stroke toward and in cooperative relation with said one tool and then a finishing stroke toward and in cooperative relation with said other tool, said drive means being automatically responsive to said reciprocation to effect a predetermined program of rapid traverse and feed movements of said carriage and to cause each feed movement during each finishing stroke to be slower than each feed movement during each roughing stroke.

9. In a machine tool, in combination, a base, two tool spindles fixed in spaced axial alinement on said base, means for driving said spindles, two cutting tools respectively on the adjacent ends of said spindles, a work support slidably mounted on said base for reciprocation longitudinally of said spindles and adapted to support the work between said spindles for presentation alternately to said tools upon movement in opposite directions, means for driving said support, said means being automatically responsive to said reciprocation to effect a predetermined program of alternate rapid traverse and feed movements of said support, and means responsive to reversal of said reciprocation to cause any feed movement in one direction to be slower than any feed movement in the opposed direction.

10. In a machine tool, in combination, two spindles, two separate motors respectively for rotating said spindles, an electric circuit including two selective control switches in parallel respectively for controlling said motors, a support, drive means for reciprocating said support relatively into and out of cooperative relation selectively with said spindles, said drive means including a control device for stopping movement of said support, a source of electric current, a master switch for connecting said source to said circuit, means responsive to the movement of said support for automatically closing and opening each control switch respectively upon movement of said support relatively into and out of said cooperative relation with the associated spindle, and means for automatically opening said master switch upon actuation of said control device to stop said support.

11. In a machine tool, in combination, a spindle, a supporting bracket in which said spindle is journaled, said bracket having a passage therein outside of said spindle for liquid coolant, drive means for rotating said spindle, means for supplying coolant to said passage, brake means for braking said spindle, a support, means for moving said support in opposite directions relatively to said spindle, and means responsive to the relative movement of said support for automatically rendering said drive and coolant means inoperable and said brake means operable upon movement of said support in one direction, and said drive and coolant means operable and said brake means inoperable upon movement of said support in the other direction.

12. In a machine tool, in combination, a base, two spindles on said base mounted in relatively fixed and longitudinally spaced relation, means for driving said spindles, two brakes one for each spindle, two cutting tools mounted respectively on the adjacent ends of said spindles, a work support on said base, drive means for effecting relative movement of said support alternately into cooperative relation with said respective spindles, and means including a part carried by and moving with said support for automatically cutting off the drive from and applying the brake for either spindle while releasing the brake and applying the drive for the other spindle upon movement of said support into cooperative relation with the latter.

13. In a machine tool, in combination, a base, a carriage reciprocable on said base, a piston and cylinder drive unit operatively connected to said carriage, a spindle journaled on said base, electric means including a switch for driving said spindle, a brake for said spindle, means operable in opposite directions respectively to close said switch and release said brake and to open said switch and apply said brake, a piston and cylinder unit for actuating said last mentioned means, said units being connected in parallel, a source of fluid under pressure, and a direction valve for connecting said source alternately to opposite ends of said units, said valve being automatically reversible upon movement of said carriage into opposite end positions.

14. In a machine tool, in combination, a base, a carriage reciprocable on said base, a piston and cylinder unit operatively connected to said carriage, fluid lines connected to opposite ends of said unit, a source of fluid under pressure, a direction valve movable in opposite directions to connect said source alternately to said lines, a plurality of spindles, a plurality of brakes one for each spindle, a common actuator for said brakes, and a piston and cylinder unit operatively connected to said actuator, said lines being connected to opposite ends of said last mentioned unit.

15. In a machine tool, in combination, a base, a carriage reciprocable on said base, a piston and cylinder unit operatively connected to said carriage, fluid lines connected to opposite ends of said unit, a source of fluid under pressure, a direction valve movable in opposite directions to connect said source alternately to said lines, a spindle, a passage for supplying coolant to said spindle, a source of coolant, and a piston and cylinder valve unit movable in opposite directions to alternately connect and disconnect said coolant source to said coolant passage, said fluid lines being connected to opposite ends of said valve unit.

16. In a machine tool, a unitary spindle structure comprising, in combination, a spindle, an electric motor comprising a stator and a rotor fixed to said spindle, said spindle projecting from both ends of said motor, an elongated sleeve through and beyond which one end portion of said spindle projects axially, a plurality of axially spaced bearings fixed in said sleeve and in which said spindle is journaled, an additional bearing located adjacent to the end of said rotor opposite from said sleeve and in which the other end portion of said spindle is journaled, and a tubular mounting bracket enclosing said stator, said additional bearing, and said sleeve throughout the major portion of the length of the latter, and serving to secure the said parts in rigid relationship.

17. In a machine tool, a spindle fixture comprising, in combination, an elongated bearing bracket having a generally cylindrical bore opening therethrough, said bore being split longitudinally, bearings closing opposite ends of said bore and defining an intermediate chamber therein, a spindle journaled in said bearings, one end of said spindle extending freely from one end of said bracket and being adapted to support a cutting tool, an electric drive motor for said spindle, said motor having a stator in said chamber, a rotor in said stator secured to and coaxial with said spindle, and securing means for contracting said bore peripherally along said split to clamp said stator in position, said bracket being formed with openings venting said chamber to the atmosphere and with internal flow passages for the circulation of coolant, whereby heat of the motor and friction is dissipated, and the temperature of the fixture is maintained relatively low.

18. In a machine tool, a spindle fixture comprising, in combination, an elongated bearing bracket having a generally cylindrical bore opening therethrough, said bore being split longitudinally, an elongated bearing sleeve in one end of said bore and extending therefrom, bearings in said last mentioned sleeve, a bearing in the other end of said bore, said sleeve and said last mentioned bearing defining an intermediate chamber in said bracket, a spindle journaled in said bearings, one end of said spindle extending freely from one end of said sleeve and being adapted to support a cutting tool, brake means operatively mounted on and coacting with the other end of said spindle outside of said bracket, an electric drive motor for said spindle, said motor having a stator in said chamber, a rotor in said stator secured to and coaxial with said spindle, and securing means for contracting said bore peripherally along said split to clamp said sleeve and said stator in position.

19. A machine tool having, in combination, a base, a carriage reciprocable thereon, means for reciprocating said carriage, opposed spindles stationarily mounted in spaced relation on said base, separate electric motors for driving said opposed spindles, switches respectively controlling the circuits to said motors, brakes respectively controlling said opposed spindles, mechanism for alternately operating the switches and brakes at the opposed ends of the machine, and means mounted on said carriage and acting in the respective opposite movements of the carriage alternately to close the switch and release the brake at the end of the machine toward which the carriage is moving, and to open the switch and apply the brake at the opposed end of the machine.

20. A machine tool having, in combination, a base, a carriage reciprocable thereon, means for reciprocating said carriage through variable ranges, opposed spindles stationarily mounted in spaced relation on said base, separate electric motors for driving said opposed spindles, switches respectively controlling the circuits to said motors, brakes respectively controlling said opposed spindles, and mechanism for operating the switch and brake at one end of the machine in alternation with the switch and brake at the other end, said mechanism including means mounted on said carriage and variable in position to conform to the variable range of reciprocation of said carriage.

21. A machine tool comprising, in combination, an elongated base having on the top a set of parallel longitudinal horizontally extending machined outer guide ways and a set of spaced machined inner slide ways parallel to and located between said guide ways, an elongated carriage slidable on said inner ways, means for reciprocating said carriage, an arched member having a horizontal elevated portion extending transversely across said inner ways and directly over said carriage, and having two spaced depending legs respectively at opposite ends slidably engaging said outer ways for movement in the direction of reciprocation of said carriage, said outer ways comprising two flat surfaces substantially in planes at an angle to each other and both parallel to the direction of reciprocation of said carriage, means for securing said member in any selected position along said outer ways, and a rotary spindle mounted on the top of said elevated portion of said member and extending generally in the direction of reciprocation of said carriage.

22. A machine tool having, in combination, a horizontal elongated base having on the top a set of parallel longitudinal horizontally extending machined outer guide ways and a set of spaced machined inner slide ways parallel to and located between said guide ways, an elongated carriage slidable on said inner ways, means for reciprocating said carriage, an arched member having a horizontal elevated portion extending transversely across said inner ways and directly over said carriage, and having two spaced depending legs respectively at opposite ends slidably engaging said outer ways for movement in the direction of reciprocation of said carriage, said outer ways being greater in length than the width of the lower ends of said legs to permit the said movement of said member, and serving to maintain the location of said member laterally of said carriage and the alinement of said member longitudinally of said carriage in all positions of movement of said member along said outer ways, means for securing said member in any selected position along said outer ways, and a plurality of parallel rotary spindles mounted on the top of said elevated portion and extending axially in the direction of reciprocation of said carriage.

23. A machine tool having, in combination, a base, two axially alined spindles, means on said base rotatably supporting said spindles in spaced relation, means for driving said spindles, two cutting tools mounted respectively on the adjacent ends of said spindles, a carriage on said base in part between said spindles for relative reciprocation longitudinally of said spindles, each full reciprocation comprising first a stroke relatively toward and in cooperative relation with one of said tools and then a stroke relatively toward and in cooperative relation with the other of said tools, and power drive means for automatically effecting said relative reciprocation including a rapid traverse and feed in each direction, said drive means being capable of adjustment to vary the rate of feed in one direction relative to the rate of feed in the other direction.

24. In a machine tool, in combination, a base, two axially aligned spindles, means on said base rotatably supporting said spindles in spaced relation, means for driving said spindles, two cutting tools mounted respectively on the adjacent ends of said spindles, a carriage on said base in part between said spindles for relative reciprocation longitudinally of said spindles, each reciprocation comprising first a stroke from an intermediate position relatively toward and in cooperative relation with one of said tools and then a stroke relatively toward and in cooperative relation with the other of said tools and then a return stroke back to said intermediate position, power drive means for automatically effecting said relative reciprocation, and means automatically operable to render said power means ineffective when said carriage returns to said intermediate position between said spindles after one complete reciprocation.

25. In a machine tool, in combination, a horizontal elongated machine base having on the top a set of parallel longitudinal horizontally extending machined outer guide ways and a set of spaced machined inner slide ways parallel to and located between said guide ways, an elongated carriage slidable on said inner ways, two arched members on opposite ends of said base, each member having a horizontal elevated portion extending transversely across said inner ways and directly over said carriage, and having two spaced depending legs respectively at opposite ends slidably engaging said outer ways for movement in the direction of reciprocation of said carriage, said outer ways being greater in length than the width of the lower ends of said legs to permit the said movement of said members, and serving to maintain the location of said members laterally of said carriage and the alignment of said members longitudinally of said carriage in all positions of movement of said members along said outer ways, means for securing said members in any selected positions along said outer ways, two rotary spindles mounted respectively on the tops of said elevated portions and extending generally in the direction of reciprocation of said carriage, and means for reciprocating said carriage, each full reciprocation comprising a stroke in one direction into operative relation to one of said spindles and then a stroke in the other direction into operative relation to the other of said spindles.

26. A boring machine comprising, in combination, a base provided with horizontal ways, an elongated carriage reciprocable on said ways, spindle supporting means extending transversely across said ways and secured to the top of said base outside of said ways and at opposite sides of said carriage, said supporting means being spaced above said ways a sufficient distance to clear said carriage in its reciprocation, two spindles mounted on said supporting means with their axes generally parallel to the direction of reciprocation of said carriage and having their operative ends extending oppositely, two fly cutting tools mounted respectively on said operative ends of said spindles and projecting laterally from the periphery thereof to internally engage tubular work mounted on said carriage, and power drive means for automatically reciprocating said carriage, first in one direction into cooperative relation with one of said tools and then in the other direction into cooperative relation with the other of said tools.

27. A machine tool comprising, in combination, a base provided with horizontal ways, a carriage mounted for a variable range of reciprocation on said ways, two spindle supports spaced apart longitudinally of said ways, each of said supports extending transversely across said ways and having its opposite ends secured to said base and being adjustable on said base longitudinally of said ways, said supports being spaced above said ways a sufficient distance to permit said carriage in its reciprocation to slide beneath said supports, two spindles journaled respectively on said supports with their axes extending in the general direction of reciprocation of said carriage, means for driving said spindles, and power drive means for reciprocating said carriage, including automatic control means adjustable at will to effect a variation in the range of said reciprocation.

28. A boring machine comprising, in combination, a base, two axially aligned spindles, means on said base rotatably supporting said spindles fixedly in spaced relation, means for driving said spindles, two fly cutting tools mounted respectively on the adjacent ends of said spindles and projecting from the periphery thereof, one of said tools describing a lesser circle of revolution than the other of said tools, a work carriage mounted on said base in part between said spindles for reciprocation longitudinally of said spindles and adapted to support work with a previously formed hole to be bored, power drive means for reciprocating said carriage, and control means for said drive means responsive to the variable movement of said carriage through a cycle comprising first successive rapid traverse and feed movements in a roughing stroke in one direction from an intermediate position between said spindles to present said hole to said one tool, then an automatic reversal, then successive rapid traverse and feed movements in a finishing stroke in the other direction past said intermediate position to present said hole to said other tool, then an automatic reversal, and finally a rapid return movement and an automatic stop in said intermediate position.

29. A boring machine comprising, in combination, an elongated base, two elevated bridge structures mounted on the top of said base and respectively extending transversely across opposite ends of said base, two spaced axially aligned spindles one mounted on each structure, means for driving said spindles, two fly cutting tools mounted respectively on the adjacent ends of said spindles and projecting beyond the periphery thereof, one of said tools describing a lesser circle of revolution than the other of said tools, a work carriage mounted on said base in part between said spindles for relative reciprocation longitudinally of said spindles and adapted to support work with a previously formed hole to be bored, said carriage in its reciprocation moving freely underneath both of said bridge structures, and power drive means for reciprocating said carriage, each reciprocation comprising first a roughing stroke in one direction to present said hole to said one tool and then a finishing stroke in the other direction to present said hole to said other tool.

30. A machine tool having, in combination, a base, two axially alined spindles, means on said base rotatably supporting said spindles in spaced relation, means for driving said spindles, two cutting tools mounted respectively on the adjacent ends of said spindles, a carriage on said base in part between said spindles for relative reciprocation longitudinally of said spindles, power drive means for reciprocating said carriage, and control means for said drive means responsive to the variable movement of said carriage and automatically operable to effect movement of said carriage through a cycle comprising first successive rapid traverse and feed movements in one direction from an intermediate position between said spindles into cooperative relation with one of said spindles, then an automatic reversal, then successive rapid traverse and feed movements in the other direction past said intermediate position into cooperative relation with the other of said spindles, then an automatic reversal, and finally a rapid return movement and an automatic stop in said intermediate position.

31. In a machine tool, in combination, a base, a carriage reciprocable on said base, an elevated bridge member mounted on said base and spanning said carriage, a spindle and driving motor therefor mounted on said bridge member, a brake on said spindle, means mounted on said bridge member for actuating said brake, and means automatically responsive to the movement of said carriage to cause said brake to be released during movement of said carriage toward said spindle and to be applied during movement of said carriage from said spindle.

32. In a machine tool, in combination, a base, a carriage reciprocable on said base, an elevated bridge member mounted on said base and spanning said carriage, a spindle mounted on said bridge member, a brake on said spindle, an hydraulic piston and cylinder unit mounted on said bridge member for actuating said brake, valve means for controlling said unit, and dogs on said carriage for actuating said valve means to release said brake upon movement of said carriage in one direction into a predetermined position and to apply said brake upon movement of said carriage in the other direction into another predetermined position.

33. In a machine tool, in combination, a support, a plurality of spindle brackets mounted on said support, a plurality of spindles one journaled in and extending through each bracket, a plurality of individual electric motors one for each spindle and mounted in the associated bracket, a plurality of brake drums one secured to each spindle outside of the associated bracket, a plurality of brake bands one coacting with each drum, and a single actuator mounted on said support for simultaneously applying or releasing said bands.

34. In a machine tool, in combination, a support, a plurality of spindles journaled on said support, means for driving said spindles, a plurality of brake elements one secured to each spindle for rotation therewith, a plurality of brake elements movable respectively into and out of braking engagement with said first mentioned elements, and a single actuator mounted on said support for simultaneously actuating said last mentioned elements to stop or release said spindles.

35. In a machine tool, in combination, two spindles, two electric motors for driving the respective spindles, electric switch means for controlling the respective motors, a reciprocatory carriage, drive means for moving said carriage relatively and alternately into cooperative relation with the respective spindles, said drive means including a control device for stopping said carriage, means responsive to the movement of said carriage for automatically actuating said switch means to effect alternate operation of said motors upon movement of said carriage in opposite directions, and means automatically operable to render both of said motors inoperative upon actuation of said control device to stop said carriage.

36. A machine tool, having, in combination, a base, a carriage reciprocable thereon, power drive means for automatically reciprocating said carriage, two spindles arranged in opposed relation, two electric motors for driving the respective spindles, electric switch means mounted on said base for controlling the respective circuits to said motors, and trip means mounted on and reciprocating with said carriage and arranged to actuate said switch means to start and stop said motors alternately in the respectively opposite movements of said carriage.

37. In a machine tool, in combination, a base, a plurality of spindles, brake means for simultaneously braking said spindles, electric drive means for said spindles, switch means for making and breaking the circuit to said drive means, a reciprocatory carriage, and means governed by the movement of said carriage for automatically closing said switch means and releasing said brake means and alternately opening said switch means and applying said brake means to respectively start and stop all of said spindles simultaneously.

38. In a machine tool, in combination, a base, a reciprocatory carriage on said base, a spindle bracket on said base, a rotary spindle journaled in said bracket, the body of said bracket having a liquid coolant passage out of communication with the moving parts of the spindle assembly, and means governed by the movement of said carriage for automatically supplying coolant and cutting off the supply of coolant to said passage upon movement of said carriage respectively into two different predetermined positions.

39. In a machine tool, in combination, a base element, a carriage element reciprocable on said base element, a spindle journaled on one of said elements, a brake for said spindle, a piston and cylinder unit operatively connected to said carriage element, two fluid supply lines connected respectively to opposite ends of said unit, a second piston and cylinder unit operatively connected to said brake and operable in opposite directions to apply and release said brake, two fluid supply lines branching from said first mentioned lines and connected respectively to opposite ends of said second unit, a source of fluid under pressure, and direction valve means operable reversibly to connect said source alternately to said first mentioned lines, said valve means being automatically operable in response to the movement of said carriage element into different predetermined positions.

40. In a machine tool, in combination, a base element, a carriage element reciprocable on said base element, a piston and cylinder unit operatively connected to said carriage element, a spindle journaled on one of said elements, electric means including a switch for driving said spindle, a brake for said spindle, means operable in opposite directions respectively to close said switch and release said brake and to open said switch and apply said brake, an hydraulic piston and cylinder unit for actuating said last mentioned means, two fluid lines leading respectively to opposite ends of said last mentioned unit, a source of fluid under pressure, valve means for connecting said source alternately to opposite ends of said first mentioned unit, said valve means including two valves mounted in spaced relation on said base element and operable to effect connection of said source alternately to said lines, dog means adjustably mounted on said carriage element for actuating said valves successively upon movement of said carriage element respectively into two different predetermined positions, each of said valves having a projected position in which it is adapted for engagement by said dog means and a retracted position in which it is operative to effect movement of the other valve into extended position, one of said valves in retracted position effecting the connection of one of said lines to said source and the other of said lines to exhaust, and the other of said valves in retracted position effecting the connection of said other line to said source and said one line to exhaust.

41. In a machine tool, in combination, a base element, a carriage element reciprocable on said base element, a spindle journaled on one of said elements, a brake for said spindle, an hydraulic cylinder and piston unit operatively connected to said brake, a source of fluid under pressure, two fluid lines leading respectively to opposite ends of said unit, reversible valve means including two valves mounted in spaced relation on said base element and operable to effect connection of said source alternately to said lines, and dog means adjustably mounted on said carriage element for actuating said valves successively upon movement of said carriage element respectively into two different predetermined positions, each of said valves having a projected position in which it is adapted for engagement by said dog means and a retracted position in which it is operative to effect movement of the other valve into extended position, one of said valves in retracted position effecting the connection of one of said lines to said source and the other of said lines to exhaust, and the other of said valves in retracted position effecting the connection of said other line to said source and said one line to exhaust.

42. In a machine tool, in combination, a base element, a carriage element, a spindle journaled on one of said elements, electric means including a switch for driving said spindle, an hydraulic piston and cylinder unit operatively connected to said switch and operable in opposite directions to open and close said switch, a source of fluid under pressure, two fluid lines leading respectively to opposite ends of said unit, reversible valve means including two valves mounted in spaced relation on said base element and operable to effect connection of said source alternately to said lines, and dog means adjustably mounted on said carriage element for actuating said valves successively upon movement of said carriage element respectively into two different predetermined positions, each of said valves having a projected position in which it is adapted for engagement by said dog means and a retracted position in which it is operative to effect movement of the other valve into extended position, one of said valves in retracted position effecting the connection of one of said lines to said source and the other of said lines to exhaust, and the other of said valves in retracted position effecting the connection of said other line to said source and said one line to exhaust.

43. In a machine tool, in combination, a base element, a carriage element reciprocable on said base element, a piston and cylinder unit operatively connected to said carriage element, a spindle journaled on one of said elements, electric means including a switch for driving said spindle, a brake for said spindle, means operable in opposite directions respectively to close said switch and release said brake and to open said switch and apply said brake, an hydraulic piston and cylinder unit for actuating said last mentioned means, a source of fluid under pressure, and valve means on said base for connecting said source alternately to the opposite ends of each of said units, said carriage element being provided with means for automatically operating said valve means at any one of a plurality of predetermined positions of said carriage element.

44. In a machine tool, in combination, a base element, a carriage element reciprocable on said base element, a piston and cylinder unit operatively connected to said carriage element, a spindle journaled on one of said elements, drive means for said spindle and adapted to be rendered operative and inoperative, a brake for said spindle, means operable in opposite directions respectively to render said drive means operative and release said brake and to render said drive means inoperative and apply said brake, an hydraulic piston and cylinder unit for actuating said last mentioned means, a source of fluid under pressure, and valve means on said base for connecting said source alternately to the opposite ends of each of said units, said carriage element being provided with means for automatically operating said valve means at any one of a plurality of predetermined positions of said carriage element.

45. In a machine tool, in combination, a base element, a carriage element reciprocable on said base element, a piston and cylinder unit operatively connected to said carriage element, a spindle journaled on one of said elements, electric drive means including a switch for driving said spindle, means operable in opposite directions respectively to close said switch and to open said switch, an hydraulic piston and cylinder unit for actuating said last mentioned means, a source of fluid under pressure, and valve means on said base for connecting said source alternately to the opposite ends of each of said units, said carriage element being provided with means for automatically operating said valve means at any one of a plurality of predetermined positions of said carriage element.

46. A machine tool having, in combination, a base, a carriage reciprocable thereon, power drive means for automatically reciprocating said carriage and including a drive motor, two spindles arranged in opposed relation, two electric motors for driving the respective spindles, electric switch means mounted on said base for controlling the respective circuits to said electric motors, trip means mounted on and reciprocating with said carriage and arranged to actuate said switch means to start and stop said motors alternately in the respectively opposite movements of said carriage, and a master switch for controlling said circuits and adapted to be opened to stop said electric motors while permitting continued operation of said first mentioned motor.

CARROLL R. ALDEN.